United States Patent
Kubo et al.

(10) Patent No.: US 6,687,443 B2
(45) Date of Patent: Feb. 3, 2004

(54) OPTICAL FIBER TRANSMISSION LINE, OPTICAL CABLE, AND OPTICAL TRANSMISSION SYSTEM

(75) Inventors: Yuji Kubo, Yokohama (JP); Makoto Shimizu, Yokohama (JP); Toshiyuki Miyamoto, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/078,153

(22) Filed: Feb. 20, 2002

(65) Prior Publication Data

US 2003/0108313 A1 Jun. 12, 2003

Related U.S. Application Data

(60) Provisional application No. 60/336,698, filed on Dec. 7, 2001.

(51) Int. Cl.[7] .............................. G02B 6/02; H04B 10/12
(52) U.S. Cl. ..................... 385/123; 385/24; 385/127; 398/37; 398/147; 398/148
(58) Field of Search .................................. 385/123, 124, 385/125, 126, 127, 128, 24; 398/37, 147, 148

(56) References Cited

U.S. PATENT DOCUMENTS

| 6,366,728 B1 | * | 4/2002 | Way et al. | 385/123 |
| 6,366,729 B1 | * | 4/2002 | Brandon et al. | 385/123 |
| 6,496,631 B2 | * | 12/2002 | Tsukitani et al. | 385/123 |
| 2003/0031440 A1 | * | 2/2003 | Dennis et al | 385/123 |

FOREIGN PATENT DOCUMENTS

| JP | 10-308706 | 11/1998 |
| JP | 2000-174702 | 6/2000 |
| JP | 2001-237777 | 8/2001 |
| JP | 2001-308790 | 11/2001 |

OTHER PUBLICATIONS

"Network Application and System Demonstration of WDM Systems with Very Large Spans (Error–Free 32×10 Gbit/s 750 km Transmission over 3 Amplified Spans of 250 km)", J. P. Blondel et al., *OFC 2000, Optical Fiber Communication Conference, Postdeadline Papers*, pp. PD31–1–PD31–3.

"1T bit/s(100ch· 10G bit/s) WDM Repeaterless Transmission over 200km with Raman Amplifier", Kiyoaki Takashina, *OFC 2000*, pp. FC8–1–FC8–3.

"1 Terabit/s WDM Transmission over 10,000 km", Takao NAITO et al, *ECOC 1998*, pp. 24–25.

"1.6 Terabit/s (160 × 10.66 Gbit/s unrepeatered transmission over 321 km using second order pumping distributed Raman amplification", L. Labrunie et al., *OAA 2001*, pp. PD3–1–PD3–3.

* cited by examiner

Primary Examiner—John D. Lee
Assistant Examiner—Jennifer Doan
(74) Attorney, Agent, or Firm—McDermott, Will & Emery

(57) ABSTRACT

The present invention relates to an optical fiber transmission line and the like comprising a structure for enabling repeating sections to become further longer. The optical fiber transmission line comprises first and second optical fibers successively disposed along the advancing direction of signal light, and an optical multiplexer for supplying Raman amplification pumping light to one of the first and second optical fibers. The first and second optical fibers are fusion-spliced to each other, whereas at least one of them has a core region substantially made of pure silica glass. The second optical fiber has an effective area smaller than that of the first optical fiber, and a chromatic dispersion and a length which are different from those of the first optical fiber. In particular, the respective lengths of the first and second optical fibers are appropriately regulated so as to effectively suppress nonlinear phenomena other than Raman amplification.

34 Claims, 14 Drawing Sheets

Fig.3

|  | SAMPLE 1 | SAMPLE 2 | SAMPLE 3 |
|---|---|---|---|
| 1ST OPTICAL FIBER | | | |
| RELATIVE REFRACTIVE INDEX DIFFERENCE OF CORE(%) | 0 | +0.06 | +0.06 |
| EFFECTIVE AREA($\mu$ m$^2$) | 105 | 110 | 110 |
| RAMAN GAIN(dB) | 0.7 | 0.6 | 0.6 |
| TRANSMISSION LOSS(dB/km) | 0.160 | 0.161 | 0.161 |
| 2ND OPTICAL FIBER | | | |
| RELATIVE REFRACTIVE INDEX DIFFERENCE OF CORE(%) | 0 | 0 | -0.05 |
| EFFECTIVE AREA($\mu$ m$^2$) | 80 | 80 | 80 |
| RAMAN GAIN(dB) | 1.0 | 1.0 | 1.0 |
| TRANSMISSION LOSS(dB/km) | 0.175 | 0.175 | 0.175 |
| 1ST AND 2ND OPTICAL FIBERS TOTAL LOSS(dB/km) | 0.168 | 0.168 | 0.168 |

Fig.4

|  | SAMPLE 4 | SAMPLE 5 |
|---|---|---|
| 1ST OPTICAL FIBER | | |
| RELATIVE REFRACTIVE INDEX DIFFERENCE OF CORE(%) | 0 | +0.06 |
| EFFECTIVE AREA($\mu$ m$^2$) | 105 | 110 |
| RAMAN GAIN(dB) | 0.7 | 0.6 |
| TRANSMISSION LOSS(dB/km) | 0.160 | 0.161 |
| 2ND OPTICAL FIBER | | |
| RELATIVE REFRACTIVE INDEX DIFFERENCE OF CORE(%) | 0 | 0 |
| EFFECTIVE AREA($\mu$ m$^2$) | 80 | 80 |
| RAMAN GAIN(dB) | 1.0 | 1.0 |
| TRANSMISSION LOSS(dB/km) | 0.175 | 0.175 |
| 3RD OPTICAL FIBER | | |
| RELATIVE REFRACTIVE INDEX DIFFERENCE OF CORE(%) | 0.35 | 0.8 |
| EFFECTIVE AREA($\mu$ m$^2$) | 80 | 45 |
| RAMAN GAIN(dB) | 1.8 | 3.5 |
| TRANSMISSION LOSS(dB/km) | 0.200 | 0.210 |
| 1ST TO 3RD OPTICAL FIBER TOTAL LOSS(dB/km) | 0.174 | 0.176 |

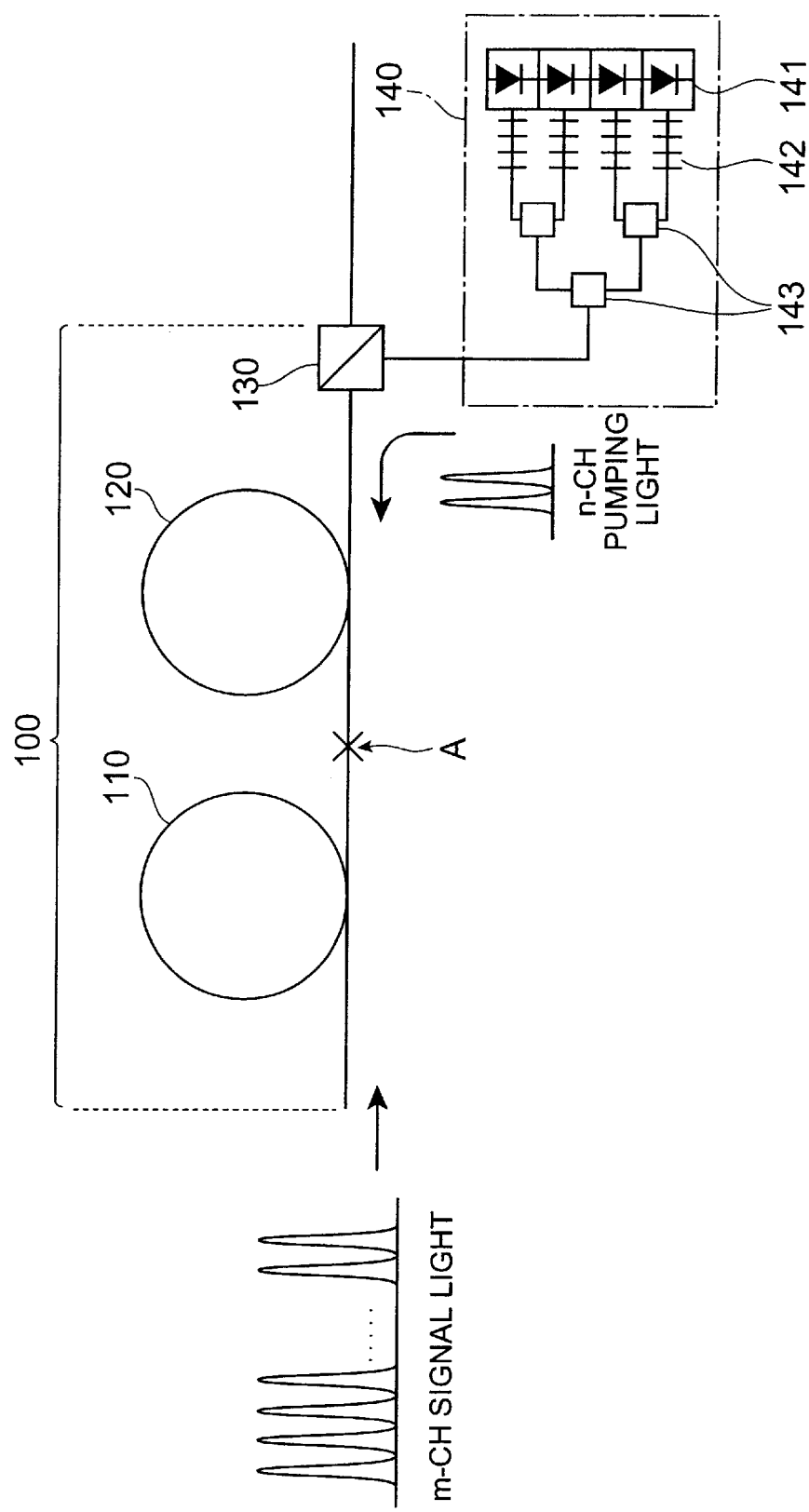

32-CH SIGNAL LIGHT

2-CH PUMPING LIGHT

SIGNAL LIGHT

SIGNAL LIGHT
PUMPING LIGHT

SIGNAL LIGHT

SIGNAL LIGHT
PUMPING LIGHT

SIGNAL LIGHT

SIGNAL LIGHT
PUMPING LIGHT

ABSTRACT# OPTICAL FIBER TRANSMISSION LINE, OPTICAL CABLE, AND OPTICAL TRANSMISSION SYSTEM

CROSS-REFERENCE TO RELATED APPLICATION

This application claims the benefit of U.S. Provisional Application No. 60/336,698, filed Dec. 7, 2001, the whole subject matter thereof being incorporated by reference herein.

BACKGROUND OF THE INVENTION

1. Field of the Invention

The present invention relates to an optical fiber transmission line suitable for high-speed transmission with a large capacity over a long distance, an optical cable including the same, and an optical transmission system including the same.

2. Related Background Art

Optical transmission systems transmit signal light including a large capacity of information over a long distance at a high speed by way of optical fiber transmission lines. Various proposals have been made in order to realize further larger capacity and longer distance in such an optical transmission system. For example, the optical transmission system disclosed in literature 1—J.-P. Blondel, et al., "Network Application and System Demonstration of WDM Systems with Very Large Spans", OFC'2000, PD31 (2000)—is a wavelength division multiplexing (WDM) transmission system which optically transmits a plurality of channels of signals in a wavelength division multiplexing manner, while comprising an optical fiber amplifier (EDFA: Erbium-Doped Fiber Amplifier) employing an optical fiber having an optical waveguide region doped with Er element as an optical amplifying medium, and a Raman amplifier utilizing a Raman scattering phenomenon. Also, in the optical transmission system disclosed in the above-mentioned literature 1, an optical fiber transmission line comprising an optical fiber having a low loss is laid in a repeating section. At least one of transmitting, repeating, and receiving stations is provided with an EDFA and means for supplying Raman amplification pumping light to the optical fiber transmission line. Such a configuration makes repeating sections longer in the optical transmission system disclosed in literature 1.

The optical transmission systems disclosed in literature 2—T. Naito, et al., "1 Terabit/s WDM Transmission over 10,000 km", ECOC'98, pp. 24–25 (1988)"—and literature 3—K. Takashina, et al., "1 Tbit/s (100 ch·10 Gbit/s) WDM Repeaterless Transmission over 200 km with Raman Amplifier", OFC'2000, FC8 (2000)—are also WDM transmission systems each comprising an EDFA and a Raman amplifier. In the optical transmission systems disclosed in literatures 2 and 3, the optical fiber transmission line laid in a repeating section is constituted by a positive dispersion optical fiber having a low transmission loss, a large effective area, and a positive chromatic dispersion, and a negative dispersion optical fiber, disposed downstream the positive dispersion optical fiber so as to compensate for the chromatic dispersion in the positive dispersion optical fiber, having a negative chromatic dispersion. At least one of transmitting, repeating, and receiving stations is provided with an EDFA and means for supplying Raman amplification pumping light to the negative dispersion optical fiber. Such a configuration restrains the waveform of signal light from deteriorating due to nonlinear optical phenomena and cumulative chromatic dispersion, whereby a larger capacity in optical transmissions and a longer distance in repeating sections are achieved.

SUMMARY OF THE INVENTION

The inventor studied the conventional optical transmission systems and, as a result, has found the following problems. Namely, as compared with long-distance optical transmission systems (e.g., a system connecting continents to each other with a submarine optical cable), medium-range optical transmission systems (e.g., a system connecting the mainland and an island to each other with a submarine optical cable) are required to further elongate their repeating sections. This is due to the fact that, in a medium-range optical transmission system connecting the mainland and an island to each other, a transmitting station, a repeating station, or a receiving station is provided only in the mainland or island, whereas there has been an increasing demand for making a non-repeating section between the mainland and island. However, there is a limit to elongation of repeating sections in each of the optical transmission systems disclosed in the above-mentioned literatures 1 to 3.

In the optical transmission system disclosed in the above-mentioned literature 1, the optical fiber transmission line is constituted by one kind of optical fiber alone, whereby it is preferred that the optical fiber have a high dopant concentration in its core region or a small effective area from the viewpoint of Raman amplification efficiency with respect to signal light in this optical fiber. However, when the dopant concentration is higher, transmission loss becomes greater due to Rayleigh scattering caused by the dopant. Also, when the effective area is smaller, nonlinear optical phenomena are more likely to occur, thereby deteriorating the waveform of signal light, thus failing to transmit signal light having a high power. Hence, there is a limit to elongation of repeating sections in the optical transmission system disclosed in literature 1.

In the optical transmission system disclosed in the above-mentioned literature 2 or 3, the optical fiber transmission line is constituted by a positive dispersion optical fiber and a negative dispersion optical fiber. In general, the negative dispersion optical fiber has a high dopant concentration in its core region, whereby its transmission loss is large due to the Rayleigh scattering caused by the dopant. Hence, there is a limit to elongation of repeating sections in the optical transmission systems disclosed in literatures 2 and 3 as well.

In order to overcome the problems mentioned above, it is an object of the present invention to provide an optical fiber transmission line comprising a structure which enables repeating sections to become further longer and can yield stable transmission characteristics even when pumping light having a higher power is supplied thereto, an optical cable including the same, and an optical transmission system including the same.

The optical fiber transmission line according to the present invention comprises first and second optical fibers successively disposed along an advancing direction of signal light, and an optical multiplexer for supplying Raman amplification pumping light to one of the first and second optical fibers. The first optical fiber comprises an entrance end for receiving signal light and an exit end for emitting the signal light, whereas the second optical fiber comprises an entrance end fusion-spliced to the exit end of the first optical fiber and an exit end for emitting the signal light, at least one of the first and second optical fibers having a core region substantially made of pure silica glass.

In particular, in this optical fiber transmission line, the first optical fiber has, as characteristics at a wavelength of 1550 nm, a first effective area $A_{\textit{eff}1}$ and a first chromatic dispersion D1, and has a first length L1. The second optical fiber has, as characteristics at the wavelength of 1550 nm, a second effective area $A_{\textit{eff}2}$ smaller than the first effective area $A_{\textit{eff}1}$ and a second chromatic dispersion D2 different from the first chromatic dispersion D1, and has a second length L2 different from the first length L1. The optical multiplexer is optically coupled to the entrance end of the first optical fiber so as to supply the Raman amplification pumping light to the first optical fiber together with the signal light, or optically coupled to the exit end of the second optical fiber so as to supply the Raman amplification pumping light to the second optical fiber while transmitting therethrough the signal light emitted from the second optical fiber.

Here, as shown in Japanese Patent application Laid-Open No. HEI 8-248251 (EP 0 724 171 A2), the above-mentioned effective area $A_{\textit{eff}}$ is given by the following expression:

$$A_{\textit{eff}} = 2\pi \left( \int_0^\infty E^2 r\, dr \right)^2 \bigg/ \left( \int_0^\infty E^4 r\, dr \right)$$

where E is the electric field accompanying the propagating light, and r is the radial distance from the center of the core region.

Recently, as optical transmissions attain a larger capacity, attention has been given to distributed Raman amplification technique in which pumping light is supplied to an optical fiber transmission line, so that the optical fiber transmission line itself becomes an optical amplifying medium. Though a high nonlinearity is required for efficiently carrying out Raman amplification, it also induces nonlinear phenomena (e.g., four-wave mixing, self-phase modulation, and cross-phase modulation) other than Raman amplification, thereby causing signals to deteriorate. Such nonlinear phenomena other than Raman amplification are more likely to occur within optical fibers as the signal light power is higher.

For effectively suppressing the above-mentioned unnecessary nonlinear phenomena other than Raman amplification, it is preferred in the optical fiber transmission line according to this first aspect that the ratio of the length of the second optical fiber (L2/(L1+L2)) to the total length of the optical fiber transmission line (L1+L2) be 0.2 or more but 0.7 or less as an appropriate length ratio between the first and second optical fibers fusion-spliced to each other.

Preferably, in the optical fiber transmission line, each of the first chromatic dispersion D1 and second chromatic dispersion D2(<D1) is positive and, specifically, the first chromatic dispersion D1 is greater than 17 ps/nm/km, whereas the second chromatic dispersion is greater than 3 ps/nm/km. When the Raman amplification pumping light is supplied to the second optical fiber, the second effective area $A_{\textit{eff}2}$ is preferably greater than 50 $\mu m^2$, whereas the first effective area $A_{\textit{eff}1}$ is preferably greater than 90 $\mu m^2$.

In an optical fiber transmission line such as the one mentioned above, it is preferred that Raman amplification pumping light be supplied to the optical fiber having the higher nonlinearity (one yielding the greater Raman gain) As the power of such Raman amplification pumping light becomes higher, signals are more likely to deteriorate due to double Rayleigh scattering and multiple reflections of signal light at the entrance end of the optical fiber on which the Raman amplification pumping light is incident. Therefore, the optical fiber transmission line according to the present invention may comprise a structure in which an optical fiber having a higher nonlinearity is held between optical fibers having a lower nonlinearity. In this case, the optical fiber transmission line comprises first to third optical fibers successively disposed along an advancing direction of signal light, at least one of which has a core region substantially made of pure silica glass, and an optical multiplexer for supplying Raman amplification pumping light to at least one of the first and third optical fibers.

The first optical fiber comprises an entrance end for receiving signal light and an exit end for emitting the signal light. The first optical fiber has, as characteristics at the wavelength of 1550 nm, a first effective area $A_{\textit{eff}1}$ and a first chromatic dispersion D1, and has a first length L1. The second optical fiber comprises an entrance end fusion-spliced to the exit end of the first optical fiber and an exit end for emitting the signal light. The second optical fiber has, as characteristics at the wavelength of 1550 nm, a second effective area $A_{\textit{eff}2}$ smaller than the first effective area $A_{\textit{eff}1}$ and a second chromatic dispersion D2 different from the first chromatic dispersion D1, and has a second length L2 different from the first length L1. Further, the third optical fiber comprises an entrance end fusion-spliced to the exit end of the second optical fiber and an exit end for emitting the signal light. The third optical fiber has, as characteristics at the wavelength of 1550 nm, a third effective area $A_{\textit{eff}3}$ greater than the second effective area $A_{\textit{eff}2}$ and a third chromatic dispersion D3 different from the second chromatic dispersion D2, and has a third length L3 different from the second length L2. The optical multiplexer is optically coupled to the entrance end of the first optical fiber so as to supply the Raman amplification pumping light to the first optical fiber together with the signal light, or optically coupled to the exit end of the third optical fiber so as to supply the Raman amplification pumping light to the third optical fiber while transmitting therethrough the signal light emitted from the third optical fiber.

Preferably, in the optical fiber transmission line having the first to third optical fibers as mentioned above, the sum of the respective lengths of the first and second optical fibers is longer than the length of the third optical fiber. In particular, when the Raman amplification pumping light is supplied to the third optical fiber, it is preferred that the ratio of the length of the third optical fiber (L3/(L1+L2+L3)) with respect to the total length (L1+L2+L3) be 0.1 or more but 0.25 or less. The length L1 of the first optical fiber is preferably equal to or longer than the length L3 of the third optical fiber.

Preferably, in the optical fiber transmission line having the first to third optical fibers as mentioned above, each of the first to third chromatic dispersions D1 to D3 (D1>D2, D2<D3) is positive and, specifically, the second chromatic dispersion D2 is greater than 3 ps/nm/km, whereas each of the first and third chromatic dispersions D1, D3 is greater than 17 ps/nm/km. Preferably, the second effective area $A_{\textit{eff}2}$ is greater than 50 $\mu m^2$. Preferably, one of the first effective area $A_{\textit{eff}1}$ and third effective area $A_{\textit{eff}3}$ is greater than 90 $\mu m^2$.

In the optical fiber transmission line according to the present invention comprising the structure mentioned above, all of the optical fibers constituting the optical fiber transmission line may have a core region substantially made of pure silica glass. Here, in each of the optical fibers constituting the optical fiber transmission line, the relative refractive index difference of the core region with reference to pure silica glass preferably has a maximum value of −0.1% or more but +0.1% or less.

In each of the optical fibers constituting any of the optical fiber transmission lines according to the first and second aspects, the optical fiber having the core region substantially made of pure silica glass preferably has a loss of 0.18 dB/km or less at a wavelength of 1550 nm, whereas the fusion-splicing loss between the optical fibers is preferably 0.2 dB or less.

The optical fiber transmission line according to the present invention may further comprise a structure for ameliorating a nonlinear phenomenon between channels included in the signal light reaching the entrance end of the first optical fiber. Also, it may further comprise an additional optical fiber having, as characteristics at a wavelength of 1550 nm, a negative chromatic dispersion and a polarization mode dispersion (PMD) of 0.2 ps.km$^{-1/2}$ or less, and an optical multiplexer for supplying Raman amplification pumping light to the additional optical fiber from at least one of entrance and exit ends thereof.

The optical cable according to the present invention includes the optical fiber transmission line comprising the structure mentioned above. The optical transmission system according to the present invention comprises a transmitter for transmitting a plurality of channels of signal light, the optical fiber transmission line having the structure mentioned above, and a receiver for receiving a signal propagated through the optical fiber transmission line.

BRIEF DESCRIPTION OF THE DRAWINGS

FIG. 2A is a sectional view showing the structure of an optical fiber employable in the optical fiber transmission line according to the present invention, whereas

FIG. 3 is a table showing various characteristics of samples 1 to 3 corresponding to a first embodiment in the optical fiber transmission line according to the present invention;

FIG. 4 is a table showing various characteristics of samples 4 and 5 corresponding to the first embodiment in the optical fiber transmission line according to the present invention;

FIG. 5 is a view showing the configuration of a second embodiment in the optical fiber transmission line according to the present invention;

DETAILED DESCRIPTION OF THE PREFERRED EMBODIMENTS

In the following, embodiments of the optical fiber transmission line, optical cable, and optical transmission system according to the present invention will be explained in detail with reference to FIGS. 1, 2A and 2B, 3 to 6, 7A to 13B, 14, and 15. In the explanation of the drawings, parts or constituents identical to each other will be referred to with numerals identical to each other without repeating their overlapping descriptions.

Figure 1:
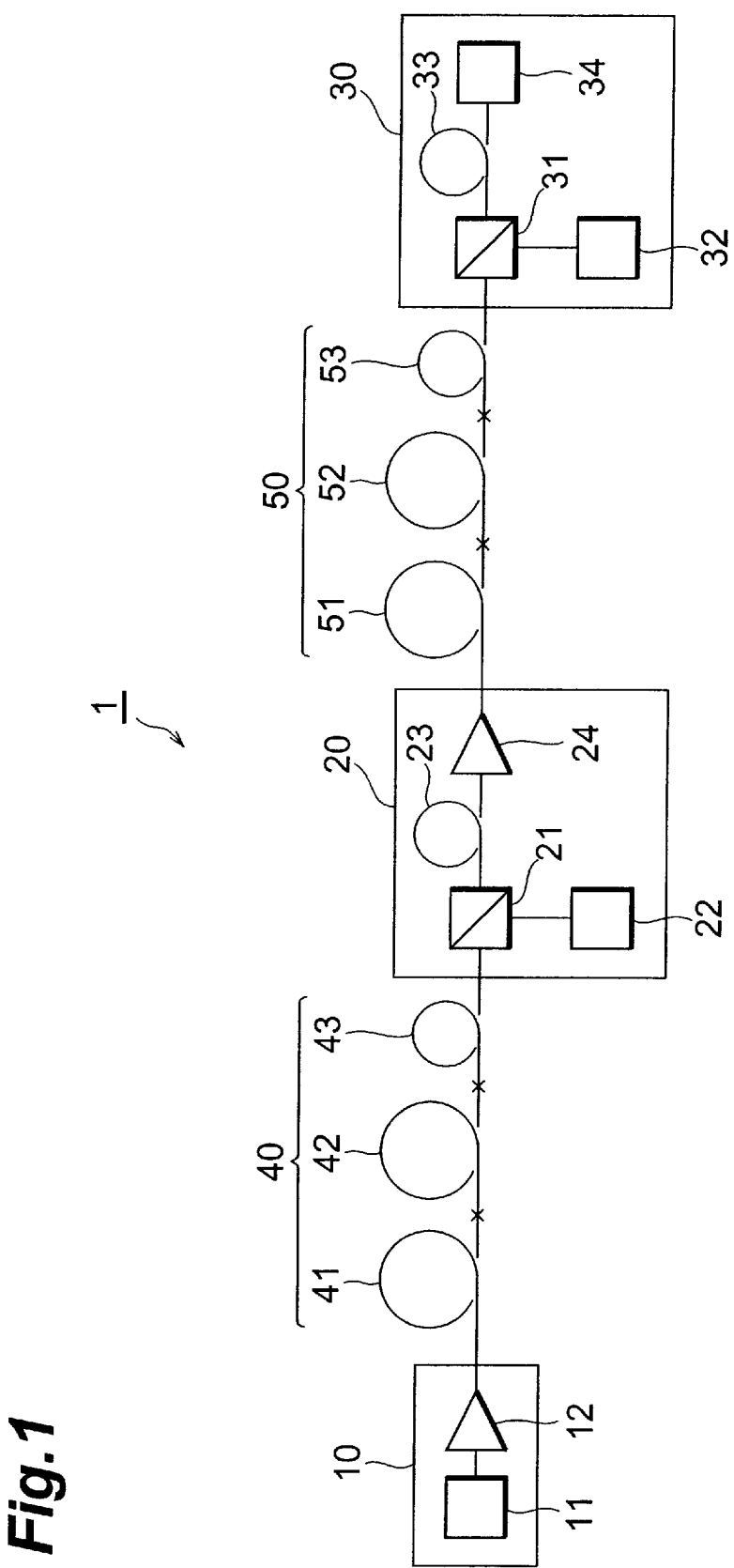
FIG. 1 is a view showing the configuration of a first embodiment in the optical transmission system according to the present invention.

FIG. 1 is a view showing the configuration of a first embodiment in the optical transmission system according to the present invention. The optical transmission system 1 according to the first embodiment includes a transmitting station 10, a repeating station 20, a receiving station 30, an optical fiber transmission line 40 laid between the transmitting station 10 and the repeating station 20, and an optical fiber transmission line 50 laid between the repeating station 20 and the receiving station 30. Each of the optical fiber transmission lines 40, 50 corresponds to a first embodiment of the optical fiber transmission line according to the present invention. The transmitting station 10 and the repeating station 20 are provided in the mainland, the optical fiber transmission line 40 is provided on the sea bottom along a coast of the mainland, and the optical fiber transmission line 50 is provided on the sea bottom between the mainland and the island, whereby the optical transmission system 1 constitutes a so-called festoon system.

The transmitting station 10 is provided with a transmitter 11 and an EDFA 12. The transmitter 11 outputs signal light including a plurality of wavelengths of signals (wavelength division multiplexed signals) included in the 1.55-μm wavelength band, for example. The EDFA 12 collectively amplifies the signal light outputted from the transmitter 11 and sends out thus amplified signal light to the optical fiber transmission line 40.

The optical fiber transmission line 40 comprises a first optical fiber 41, a second optical fiber 42, and a third optical fiber 43 which are fusion-spliced to one another. The signal light sent out from the EDFA 12 of the transmitting station 10 successively propagates through the first optical fiber 41, second optical fiber 42, and third optical fiber 43, thereby reaching the repeating station 20.

The repeating station 20 is provided with an optical coupler 21, a pumping light source 22, a dispersion-compensating optical fiber 23, and an EDFA 24. The optical coupler 21 outputs Raman amplification pumping light outputted from the pumping light source 22 to the third optical fiber 43 of the optical fiber transmission line 40, and outputs the signal light propagated through the optical fiber transmission line 40 to the dispersion-compensating optical fiber 23. The pumping light source 22 outputs Raman amplification pumping light having a wavelength which can Raman-amplify the signal light successively propagating through the second optical fiber 42 and third optical fiber 43. When the signal light includes a wavelength component in the 1.55-μm wavelength band, the wavelength of Raman amplification pumping light is about 1.45 μm. The dispersion-compensating optical fiber 23 compensates for the chromatic dispersion of the optical fiber transmission line 40 including the first optical fiber 41, second optical fiber 42, and third optical fiber 43. The EDFA 24 amplifies the signal light propagated through the dispersion-compensating optical fiber 23 and sends out thus amplified signal light to the optical fiber transmission line 50.

The optical fiber transmission line 50 comprises a first optical fiber 51, a second optical fiber 52, and a third optical fiber 53 which are fusion-spliced to one another. The signal light sent out from the EDFA 24 of the repeating station 20 successively propagates through the first optical fiber 51, second optical fiber 52, and third optical fiber 53, thereby reaching the receiving station 30.

The receiving station 30 is provided with an optical coupler 31, a pumping light source 32, a dispersion-compensating optical fiber 33, and a receiver 34. The optical coupler 31 outputs Raman amplification pumping light outputted from the pumping light source 32 to the third optical fiber 53 of the optical fiber transmission line 50, and outputs the signal light propagated through the optical fiber transmission line 50 to the dispersion-compensating optical fiber 33. The pumping light source 32 outputs Raman amplification pumping light having a wavelength which can Raman-amplify the signal light propagating through the second optical fiber 52 and third optical fiber 53. When the signal light includes a wavelength component in the 1.55-μm wavelength band, the wavelength of Raman amplification pumping light is about 1.45 μm. The dispersion-compensating optical fiber 33 compensates for the chromatic dispersion of the optical fiber transmission line 50 including the first optical fiber 51, second optical fiber 52, and third optical fiber 53. The receiver 34 demultiplexes the signal light propagated through the dispersion-compensating optical fiber 33 into the individual signal channels, and receives thus demultiplexed light as a signal of each channel.

The optical fiber transmission lines 40, 50 will further be explained. Each of the first optical fiber 41 and second optical fiber 42 in the optical fiber transmission line 40, and each of the first optical fiber 51 and second optical fiber 52 in the optical fiber transmission line 50 comprises a core region substantially made of pure silica glass and a cladding region doped with F element. Each of such optical fibers 41, 42, 51, 52 has a lower transmission loss and better hydrogen resistance characteristic and radiation resistance characteristic as compared with an optical fiber having a core region doped with $GeO_2$. Even when the core region contains dopants (e.g., Ge, F, Cl, P, B, and the like), each of the optical fibers 41, 42, 51, 52 can suppress transmission loss to a sufficiently low level if the amount of dopants is so minute that the maximum value of relative refractive index difference in the core region with reference to the refractive index of pure silica glass is −0.1% to +0.1%.

Though each of the third optical fiber 43 in the optical fiber transmission line 40 and the third optical fiber 53 in the optical fiber transmission line 50 may comprise a core region substantially made of pure silica glass, the core region more preferably contains a dopant such as $GeO_2$. This is because of the fact that the Raman gain of the optical fibers 43, 53 increases when the core region contains a dopant such as $GeO_2$.

Let $A_{41}$, $G_{41}$, and $L_{41}$ be the effective area, Raman gain, and length of the first optical fiber 41 in the optical fiber transmission line 40, respectively. Let $A_{42}$, $G_{42}$, and $L_{42}$ be the effective area, Raman gain, and length of the second optical fiber 42, respectively. Let $L_{43}$ be the length of the third optical fiber 43. Then, these parameters have the following relationships:

$$A_{41} > A_{42} \tag{1a}$$

$$G_{41} < G_{42} \tag{1b}$$

$$L_{41} + L_{42} > L_{43} \tag{1c}$$

Let $A_{51}$, $G_{51}$, and $L_{51}$ be the effective area, Raman gain, and length of the first optical fiber 51 in the optical fiber transmission line 50, respectively. Let $A_{52}$, $G_{52}$, and $L_{52}$ be the effective area, Raman gain, and length of the second optical fiber 52, respectively. Let $L_{53}$ be the length of the third optical fiber 53. Then, these parameters have the following relationships:

$$A_{51} > A_{52} \tag{2a}$$

$$G_{51} < G_{52} \tag{2b}$$

$$L_{51} + L_{52} > L_{53} \tag{2c}$$

In the optical transmission system 1 according to the first embodiment, the signal light outputted from the transmitter 11 of the transmitting station 10 is amplified by the EDFA 12 and then sent out to the optical fiber transmission line 40. The signal light outputted from the EDFA 12 successively propagates through the first optical fiber 41, second optical fiber 42, and third optical fiber 43 of the optical fiber transmission line 40, thereby reaching the repeating station 20. The Raman amplification pumping light is supplied to the second optical fiber 42 and third optical fiber 43 from the optical coupler 21 and pumping light source 22 of the repeating station 20, whereby the signal light is Raman-amplified while propagating through the optical fibers 42, 43.

The signal light having reached the repeating station 20 successively passes through the optical coupler 21 and dispersion-compensating optical fiber 23, and then is amplified by the EDFA 24 and sent out to the optical fiber transmission line 50. The signal light outputted from the EDFA 24 successively propagates through the first optical fiber 51, second optical fiber 52, and third optical fiber 53 of the optical fiber transmission line 50, thereby reaching the receiving station 30. The Raman amplification pumping light is supplied to the second optical fiber 52 and third optical fiber 53 from the optical coupler 31 and pumping light source 32 of the receiving station 30, whereby the signal light is Raman-amplified while propagating through the optical fibers 52, 53. The signal light having reached the receiving station 30 successively propagates through the optical coupler 31 and dispersion-compensating optical fiber 33, and then is received by the receiver 34.

Since the optical fiber transmission lines 40 and 50, each corresponding to the optical fiber transmission line according to the first embodiment, satisfy the respective sets of relationships (1a) to (1c) and (2a) to (2c) mentioned above, whereas each of the optical fibers 41, 42, 51, 52 has a core region substantially made of pure silica glass, the following effects are exhibited.

Namely, the signal light sent out from the transmitting station 10 initially propagates through the first optical fiber 41 having a relatively large effective area in the optical fiber transmission line 40, so as to lower its power, and then propagates through the second optical fiber 42 having a relatively small effective area. Therefore, even when the power of signal light transmitted from the transmitting station 10 to the optical fiber transmission line 40 is high, nonlinear optical phenomena are effectively restrained from occurring in the optical fiber transmission line 40. The same holds for the optical fiber transmission line 50 as well.

Also, the signal light transmitted from the transmitting station 10 initially propagates through the first optical fiber 41 having a relatively small Raman gain in the optical fiber transmission line 40, so as to lower its power, and then successively propagates through the second optical fiber 42 having a relatively large Raman gain and the third optical fiber 43. The Raman amplification pumping light is supplied to the second optical fiber 42 and third optical fiber 43 from the repeating station 20. Therefore, the signal light having lowered its power by propagating through the first optical fiber 41 is Raman-amplified while propagating through the second optical fiber 42 and third optical fiber 43, whereby the transmission loss in the second optical fiber 42 and third optical fiber 43 is compensated for. The same holds for the optical fiber transmission line 50 as well.

Each of the first optical fiber 41 and second optical fiber 42 in the optical fiber transmission line 40 has a core region substantially made of pure silica glass (or a core region whose relative refractive index difference with reference to the refractive index of pure silica glass has a maximum value of −0.1% to +0.1%), and a cladding region doped with F element and disposed at the outer periphery of the core region. Due to this structure, the optical fibers 41, 42 have a low transmission loss and are excellent in their hydrogen resistance characteristic and radiation resistance characteristic. The same holds for the optical fiber transmission line 50 as well.

Further, since the third optical fiber 43 having a greater Raman gain is disposed downstream the second optical fiber 42 in the optical fiber transmission line 40, the power of signal light reaching the repeating station 20 by propagating through the optical fiber transmission line 40 can further be restored. If the third optical fiber 43 is too long, however, the transmission loss of signal light propagating through the third optical fiber 43 will become so large that the loss of Raman amplification pumping light propagating through the third optical fiber 43 will increase. Therefore, it is preferred that the sum of the respective lengths of the first optical fiber 41 and second optical fiber 42 ($L_{41}+L_{42}$) be set longer than the length $L_{43}$ of the third optical fiber 43 as indicated by the above-mentioned expression (1c). This can fully reduce the transmission loss of the optical fiber transmission line 40 as a whole, and sufficiently Raman-amplify the signal light in the second optical fiber 42 and third optical fiber 43. The same holds for the optical fiber transmission line 50 as well.

Due to the foregoing configuration, the optical transmission system 1 according to the first embodiment and the optical fiber transmission lines 40, 50 according to the first embodiment can elongate the repeating section between the transmitting station 10 and repeating station 20, and the repeating section between the repeating station 20 and receiving station 30 as compared with the prior art. Therefore, the optical transmission system 1 can favorably be used as a festoon system, for example.

An optical fiber substantially made of pure silica glass which is applicable not only to the optical fiber transmission lines 40, 50 according to the first embodiment as mentioned above but also to optical fiber transmission lines according to other embodiments explained later has the sectional structure shown in FIG. 2A. This optical fiber 300 comprises a core region 310 with a refractive index $n_0$ (=pure silica level) extending along a predetermined axis, and a cladding region with a refractive index $n_c$ covering the outer periphery of the core region 310. The core region 310 is preferably made of pure silica glass but may have a relative refractive index difference (=$(n_{max}-n_0)/n_0$) with a maximum value of −0.1% to +0.1% with reference to pure silica glass.

Figure 2A:
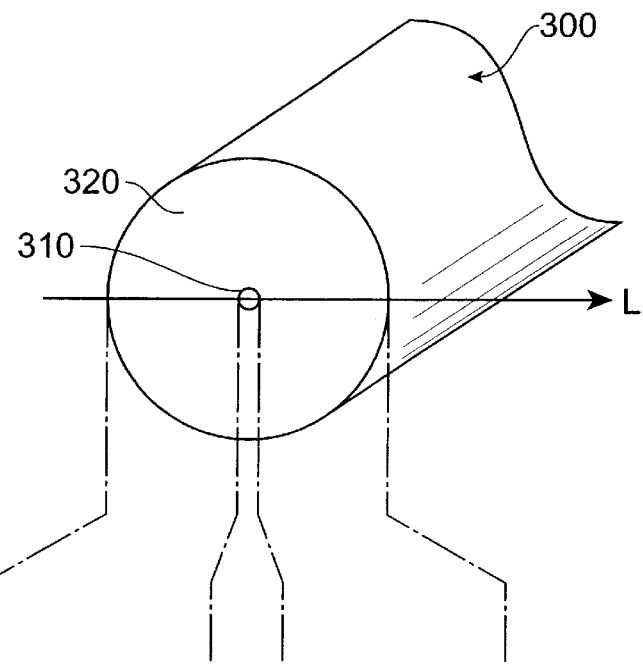
Figure 2B:
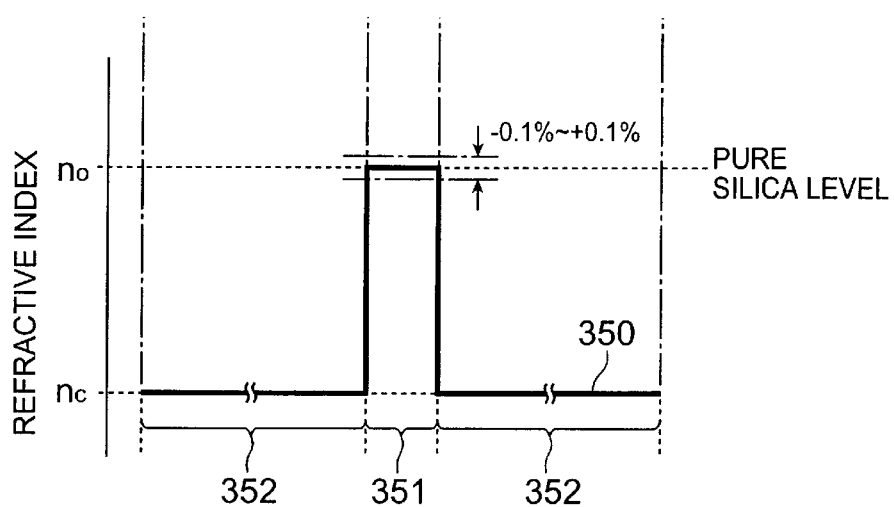
FIG. 2B is a refractive index profile thereof.

FIG. 2B shows a refractive index profile 350 of the optical fiber 300 shown in FIG. 2A, indicating the refractive index of each part on line L in FIG. 2A. In this refractive index profile 350, areas 351 and 352 represent respective refractive indices of the core 310 and cladding region 320 on line L. In this specification, the maximum value of relative refractive index difference of the core region 310 with reference to pure silica glass is expressed in terms of percentage.

Samples corresponding to the optical fiber transmission lines 40, 50 according to the first embodiment having the structure mentioned above will now be explained. FIG. 3 is a table showing various characteristics of each of samples 1 to 3 corresponding to the optical fiber transmission line according to the first embodiment. FIG. 4 is a table showing various characteristics of each of samples 4 and 5 corresponding to the optical fiber transmission line according to the first embodiment. Each of samples 1 to 3 comprises the first and second optical fibers fusion-spliced to each other without including the third optical fiber. Each of samples 4 and 5 includes the third optical fiber having a core region doped with $GeO_2$, thus comprising the first to third optical fibers fusion-spliced to one another. Concerning these optical fibers, FIGS. 3 and 4 show the relative refractive index difference of the core region with reference to the refractive index of pure silica glass, effective area, Raman gain obtained when Raman amplification pumping light having a power of 20 dBm at a wavelength of 1480 nm is made incident on the optical fiber having a length of 10 km, and transmission loss. FIG. 3 also shows the loss of the transmission line as a whole when the first and second optical fibers are spliced to each other at a length ratio of 1:1. On the other hand, FIG. 4 shows the loss of the transmission line as a whole when the first to third optical fibers are spliced to one another at a length ratio of 2:2:1.

In sample 1, the first optical fiber has a core region with a relative refractive index difference of 0%, an effective area of 105 $\mu m^2$, a Raman gain of 0.7 dB, and a transmission loss of 0.160 dB/km. The second optical fiber has a core region with a relative refractive index difference of 0%, an effective area of 80 $\mu m^2$, a Raman gain of 1.0 dB, and a transmission loss of 0.175 dB/km. Sample 1 composed of the first and second optical fibers spliced to each other at a length ratio of 1:1 has an average transmission loss of 0.168 dB/km as a whole.

In sample 2, the first optical fiber has a core region with a relative refractive index difference of +0.06%, an effective area of 110 $\mu m^2$, a Raman gain of 0.6 dB, and a transmission loss of 0.161 dB/km. The second optical fiber has a core region with a relative refractive index difference of 0%, an effective area of 80 $\mu m^2$, a Raman gain of 1.0 dB, and a transmission loss of 0.175 dB/km. Sample 2 composed of the first and second optical fibers spliced to each other at a length ratio of 1:1 has an average transmission loss of 0.168 dB/km as a whole.

In sample 3, the first optical fiber has a core region with a relative refractive index difference of +0.06%, an effective area of 110 $\mu m^2$, a Raman gain of 0.6 dB, and a transmission loss of 0.161 dB/km. The second optical fiber has a core region with a relative refractive index difference of −0.05%, an effective area of 80 $\mu m^2$, a Raman gain of 1.0 dB, and a transmission loss of 0.175 dB/km. Sample 3 composed of the first and second optical fibers spliced to each other at a length ratio of 1:1 has an average transmission loss of 0.168 dB/km as a whole.

In sample 4, the first optical fiber has a core region with a relative refractive index difference of +0.06%, an effective area of 110 $\mu m^2$, a Raman gain of 0.6 dB, and a transmission loss of 0.161 dB/km. The second optical fiber has a core region with a relative refractive index difference of 0%, an effective area of 80 $\mu m^2$, a Raman gain of 1.0 dB, and a transmission loss of 0.175 dB/km. The third optical fiber has a core region with a relative refractive index difference of 0.35%, an effective area of 80 $\mu m^2$, a Raman gain of 1.8 dB, and a transmission loss of 0.200 dB/km. Sample 4 composed of the first to third optical fibers spliced to one another at a length ratio of 2:2:1 has an average transmission loss of 0.174 dB/km as a whole.

In sample 5, the first optical fiber has a core region with a relative refractive index difference of +0.06%, an effective area of 110 $\mu m^2$, a Raman gain of 0.6 dB, and a transmission loss of 0.161 dB/km. The second optical fiber has a core region with a relative refractive index difference of −0.05%, an effective area of 80 $\mu m^2$, a Raman gain of 1.0 dB, and a transmission loss of 0.175 dB/km. The third optical fiber has a core region with a relative refractive index difference of 0.8%, an effective area of 45 $\mu m^2$, a Raman gain of 3.5 dB, and a transmission loss of 0.210 dB/km. Sample 5 composed of the first to third optical fibers spliced to one another at a length ratio of 2:2:1 has an average transmission loss of 0.176 dB/km as a whole.

In each of the above-mentioned samples 1 to 5, the effective area of the first optical fiber is greater than that of the second optical fiber, whereas the Raman gain of the first optical fiber is smaller than that of the second optical fiber. The core region of each of the first and second optical fibers is substantially made of pure silica glass (or has a relative refractive index difference with a maximum value of −0.1% to +0.1%), so that each of the first and second optical fibers has a low transmission loss. In each of these samples 1 to 5, the transmission line as a whole has a small average transmission loss. Even in the structure further comprising the third optical fiber having a core region doped with $GeO_2$ in addition to the first and second optical fibers, as in samples 4 and 5, the length ratio of the third optical fiber in the whole transmission line is small, whereby the transmission line as a whole also has a small average transmission loss.

FIG. 5 is a view showing the configuration of a second embodiment in the optical fiber transmission line according to the present invention. In FIG. 5, the optical fiber transmission line 100 according to the second embodiment comprises a first optical fiber 110, a second optical fiber 120, and an optical multiplexer 130 successively disposed along the advancing direction of signal light.

The optical multiplexer 130 transmits therethrough signal light from the second optical fiber 120, and supplies Raman amplification pumping light from a pumping light source 140 to the second optical fiber 120. The pumping light source 140 comprises LDs (Laser Diodes) 141 which are light sources, wavelength selecting filters 142, and multiplexers 143 for multiplexing the pumping light transmitted through the wavelength selecting filters 142 from the LDs 141 and outputting n channels of Raman amplification pumping light. The first optical fiber 110 comprises an entrance end for receiving m channels of signal light, and an exit end for emitting the signal light. The second optical fiber 120 comprises an entrance end fusion-spliced to the exit end of the first optical fiber 110 and an exit end for emitting the signal light. In FIG. 5, point A indicates the fused point between the first optical fiber 110 and second optical fiber 120.

In the optical fiber transmission line 100 according to the second embodiment, at least one of the first optical fiber 110 and second optical fiber 120 has a core region substantially made of pure silica glass. Also, the first optical fiber 110 has, as characteristics at a wavelength of 1550 nm, a first effective area $A_{eff1}$ and a first chromatic dispersion D1, and a first length L1. The second optical fiber 120 has, as characteristics at a wavelength of 1550 nm, a second effective area $A_{eff2}$ smaller than the first effective area $A_{eff1}$ and a second chromatic dispersion D2 different from the first chromatic dispersion D1, and a second length L2 different from the first length L1.

Specifically, it is preferred that the first effective area $A_{eff1}$ be greater than 90 $\mu m^2$, and that the second effective area $A_{eff2}$ ($<A_{eff1}$) be greater than 50 $\mu m^2$. Preferably, the first chromatic dispersion D1 is greater than 17 ps/nm/km, whereas the second chromatic dispersion D2 is greater than 3 ps/nm/km.

In the optical fiber transmission line 100 according to the second embodiment, as an appropriate length ratio between the first optical fiber 110 having a lower nonlinearity and the second optical fiber 120 having a higher nonlinearity which are spliced to each other at the fused point A as mentioned above, the ratio (L2/(L1+L2)) of the length of the second optical fiber 120 (optical fiber positioned on the pumping light entrance side) to the total length of the optical fiber transmission line 100 (L1+L2) is preferably 0.2 or more but 0.7 or less.

Figure 6:
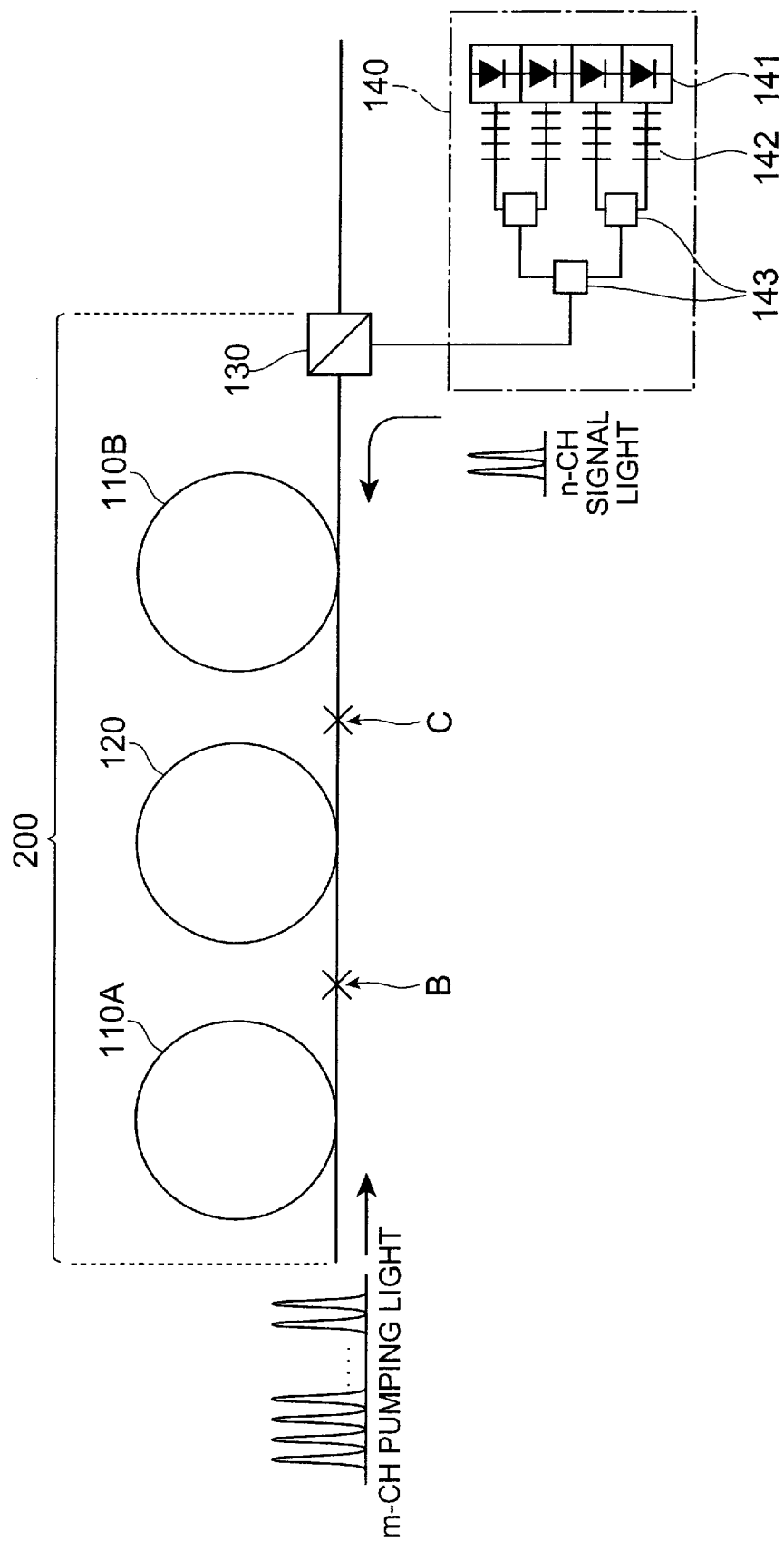
FIG. 6 is a view showing the configuration of a third embodiment in the optical fiber transmission line according to the present invention.

FIG. 6 is a view showing the configuration of a third embodiment in the optical fiber transmission line according to the present invention. The optical fiber transmission line 200 according to the third embodiment comprises a structure in which an optical fiber having a higher nonlinearity is held between optical fibers having a lower nonlinearity. Specifically, as shown in FIG. 6, the optical fiber transmission line 200 according to the third embodiment comprises a first optical fiber 110A, a second optical fiber 120, and a third optical fiber 110B, at least one of which has a core region substantially made of pure silica glass, and an optical multiplexer 130 successively disposed along the advancing direction of signal light. In FIG. 6, point B indicates the fused point between the first optical fiber 110A and second optical fiber 120, whereas point C indicates the fused point between the second optical fiber 120 and third optical fiber 110B.

The optical multiplexer 130 transmits therethrough signal light from the second optical fiber 120, and supplies Raman amplification pumping light from a pumping light source 140 to the second optical fiber 120. The pumping light source 140 comprises LDs (Laser Diodes) 141 which are light sources, wavelength selecting filters 142, and multiplexers 143 for multiplexing the pumping light transmitted through the wavelength selecting filters 142 from the LDs 141 and outputting n channels of Raman amplification pumping light. The first optical fiber 110A comprises an entrance end for receiving m channels of signal light, and an exit end for emitting the signal light. The first optical fiber 110A has, as characteristics at a wavelength of 1550 nm, a first effective area $A_{eff1}$ and a first chromatic dispersion D1, and a first length L1. The second optical fiber 120 comprises an entrance end fusion-spliced to the exit end of the first optical fiber 110A and an exit end for emitting the signal light. The second optical fiber 120 has, as characteristics at a wavelength of 1550 nm, a second effective area $A_{e\!f\!f2}$ smaller than the first effective area $A_{e\!f\!f1}$ and a second chromatic dispersion D2 different from the first chromatic dispersion D1, and a second length L2 different from the first length L1. Further, the third optical fiber 110B has an entrance end fusion-spliced to the exit end of the second optical fiber 120, and an exit end for emitting the signal light. The third optical fiber 110B has, as characteristics at a wavelength of 1550 nm, a third effective area $A_{e\!f\!f3}$ greater than the second effective area $A_{e\!f\!f2}$ and a third chromatic dispersion D3 different from the second chromatic dispersion D2, and a third length L3 different from the second length L2.

Preferably, in the optical fiber transmission line 200 according to the third embodiment, each of the first to third chromatic dispersions D1 to D3 (D1>D2, D2<D3) is positive and, specifically, the second chromatic dispersion D2 is greater than 3 ps/nm/km, and each of the first and third chromatic dispersions D1, D3 is greater than 17 ps/nm/km. Preferably, the second effective area $A_{e\!f\!f2}$ is greater than 50 $\mu m^2$. Preferably, at least one of the first and third effective areas $A_{e\!f\!f1}$, $A_{e\!f\!f3}$ (>$A_{e\!f\!f2}$) is greater than 90 $\mu m^2$.

Preferably, in the optical fiber transmission line 200 according to the third embodiment, the ratio (L3/(L1+L2+L3)) of the length of the third optical fiber (optical fiber positioned on the pumping light entrance side) with respect to the total length (L1+L2+L3) of the optical fiber transmission line 200 is 0.1 or more but 0.25 or less.

In the optical fiber transmission lines 40, 50, 100, 200 according to the first to third embodiments mentioned above, all the optical fibers constituting the optical fiber transmission lines may have a core region substantially made of silica glass. Preferably, an optical fiber having a core region made of pure silica glass as such has, at a wavelength of 1550 nm, a loss of 0.1 dB/km or less and a polarization mode dispersion of 0.1 ps.km$^{-1/2}$. Preferably, the fusion-splicing loss between these optical fibers is 0.2 dB or less.

Figure 7A:
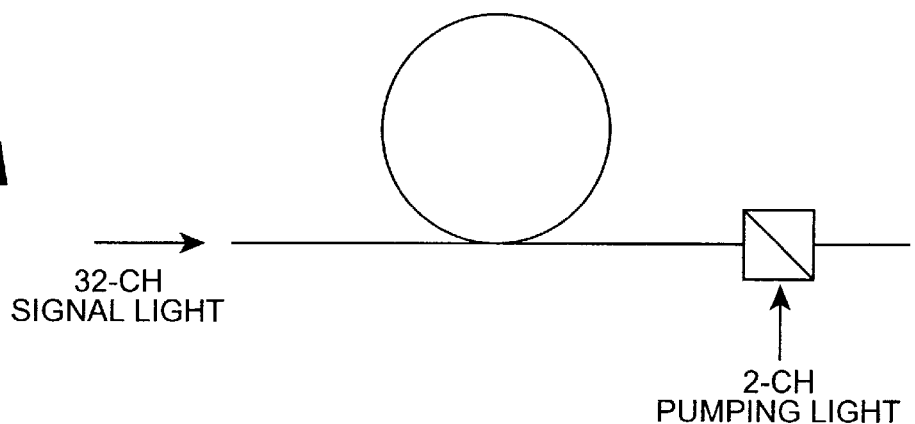
FIGS. 7A, 7B, 7C and 7D are views showing respective configurations of optical fiber transmission lines used for simulation.

The inventor simulated an optimal fiber arrangement in the optical fiber transmission lines according to the second and third embodiments by changing repeating section length and Raman gain. FIG. 7A is a view showing a schematic configuration of optical fiber transmission lines prepared. Configurations of transmission lines 300 studied in practice are a transmission line constituted by a single optical fiber (FIG. 7B), a two-part transmission line (FIG. 7C) constituted by two optical fibers as in the configuration shown in FIG. 5, and a three-part transmission line (FIG. 7D) constituted by three optical fibers as in the configuration shown in FIG. 6. Prepared optical fibers are an optical fiber A having a lower nonlinearity (corresponding to the first optical fiber 110 in the second embodiment and the first and third optical fibers 110A, 110B in the third embodiment), an optical fiber B having a higher nonlinearity (corresponding to the second optical fiber 120 according to the second and third embodiments), and a standard single-mode optical fiber (hereinafter referred to as SSMF), each having the structure shown in FIGS. 2A and 2B. The optical fiber transmission line shown in FIG. 7A comprises a counter-propagating pumping type configuration so that pumping light is supplied to an optical fiber positioned downstream in the advancing direction of signal light.

The optical fiber A has a Raman gain coefficient of 0.247 (1/W/km) and, as characteristics at a wavelength of 1550 nm, a transmission loss of 0.170 dB/km, a Rayleigh scattering coefficient of 3.1×10$^{-8}$ (1/W), and an effective area $A_{e\!f\!f}$ of 110 $\mu m^2$. The optical fiber B has a Raman gain coefficient of 0.385 (1/W/km) and, as characteristics at a wavelength of 1550 nm, a transmission loss of 0.171 dB/km, a Rayleigh scattering coefficient of 4.8×10$^{-8}$ (1/W), and an effective area $A_{e\!f\!f}$ of 73 $\mu m^2$. The SSMF has a Raman gain coefficient of 0.367 (1/W/km) and, as characteristics at a wavelength of 1550 nm, a transmission loss of 0.187 dB/km, a Rayleigh scattering coefficient of 4.67×10$^{-8}$ (1/W), and an effective area $A_{e\!f\!f}$ of 85 $\mu m^2$.

The signal light supplied to the transmission line 300 has 32 channels ranging from 1538.5 nm to 1563.3 nm at wavelength intervals of 100 GHz (32-CH signal light). With the worst value of phase shift amount being fixed to 0.3 rad, the signal light power is regulated as necessary so as to keep the worst value. The pumping light has two channels of 1432.5 nm and 1449.5 nm (2-CH pumping light). The pumping light power is also regulated in synchronization with power fluctuations in the signal light outputted from the transmission line 300.

Figure 7B:
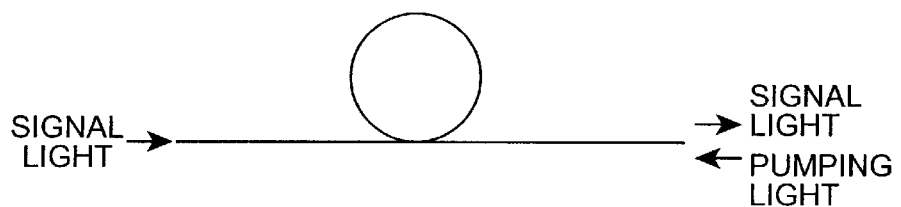
Figure 7C:
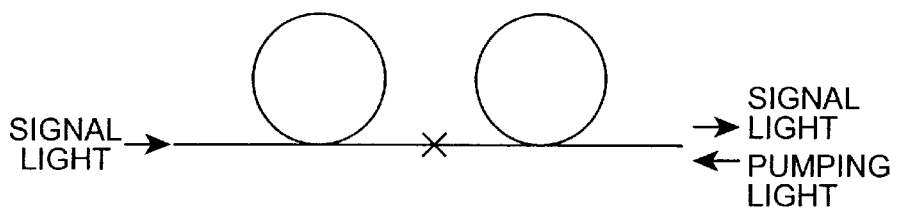
Figure 7D:
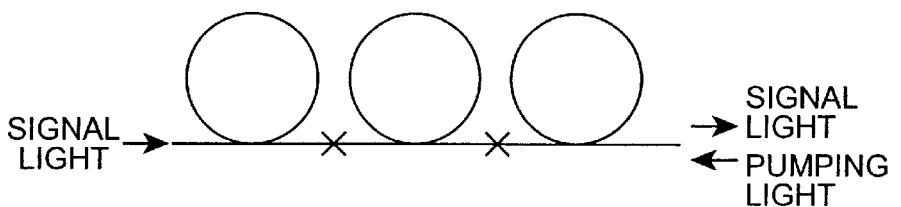

Concerning the single transmission line (FIG. 7B: SSMF), two-part transmission line (FIG. 7C: optical fiber A—optical fiber B), and three-part transmission line (FIG. 7D: optical fiber A—optical fiber B—optical fiber A), each having a total length of 250 km and a net gain of −16 dB, FIGS. 8A and 8B show relationships between the ratio (%) of length of optical fiber A in the whole transmission line 300 and the optical SN ratio (FIG. 8A) and relationships between the length ratio (%) of optical fiber A and the total pumping light power (W) (FIG. 8B).

Figure 8A:
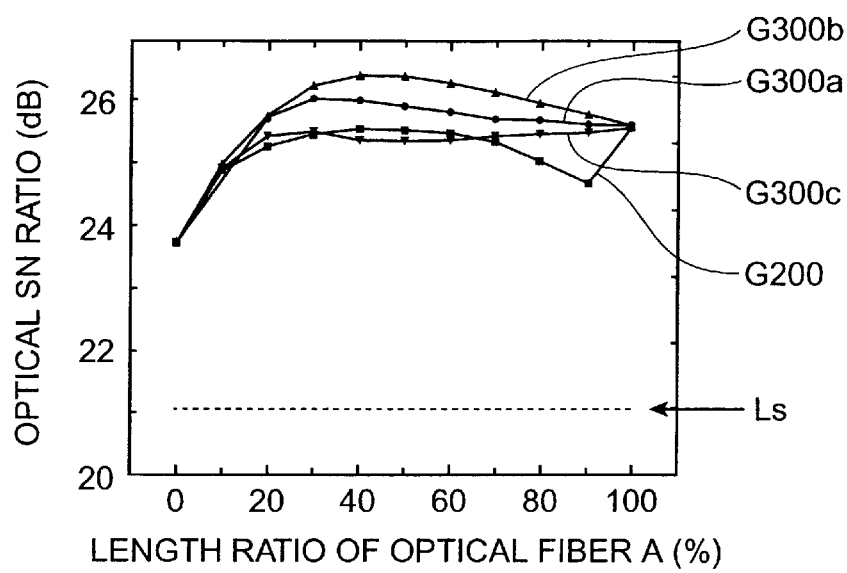
FIGS. 8A and 8B are graphs showing influences on a transmission characteristic of the whole transmission line when the length ratio of specific optical fibers is changed in each of single, two-part, and three-part transmission lines (with a total length of 250 km and a net gain of −16 dB)

In particular, in FIG. 8A, curves G200, G300a, G300b, and G300c show respective relationships between the length ratio (%) of optical fiber A and optical SN ratio (dB) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 8A, line Ls indicates the relationship between the length ratio (%) of optical fiber A and optical SN ratio (dB) in SSMF.

Figure 8B:
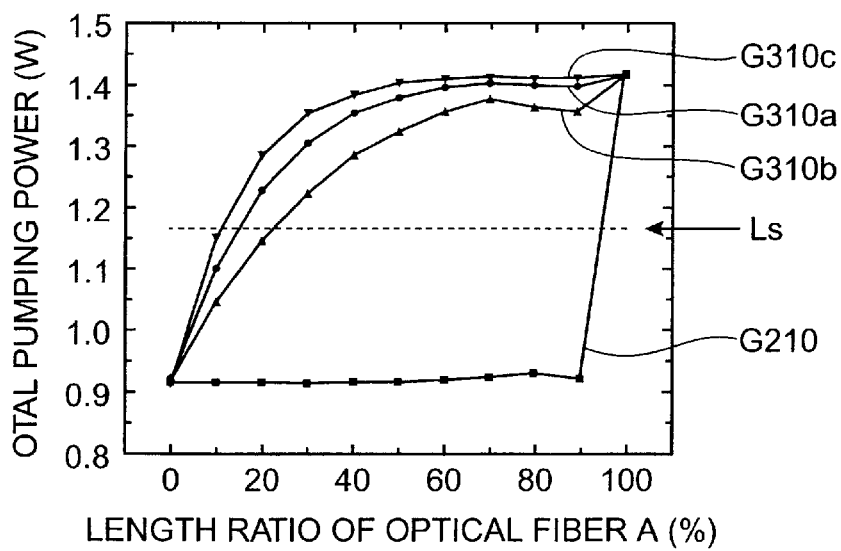

In FIG. 8B, on the other hand, curves G210, G310a, G310b, and G310c show respective relationships between the length ratio (%) of optical fiber A and total pumping light power (W) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 8B, line Ls indicates the relationship between the length ratio (%) of optical fiber A and total pumping light power (W) in SSMF.

Figure 9A:
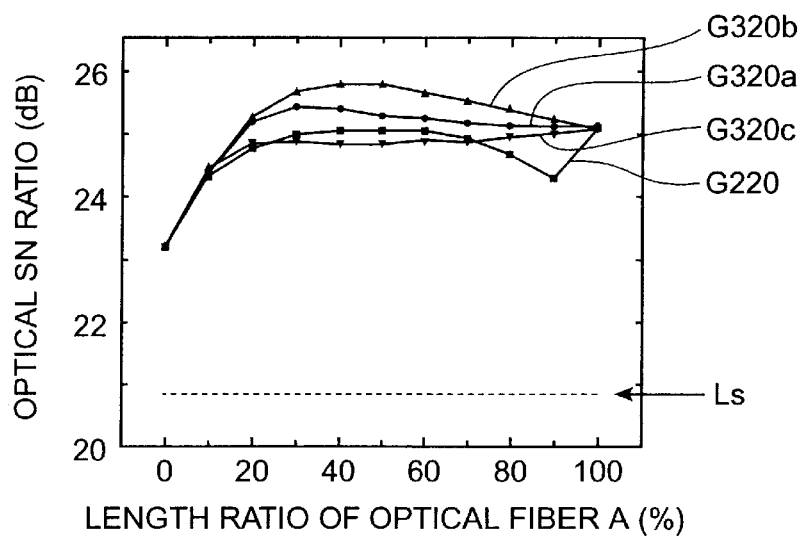
FIGS. 9A and 9B are graphs showing influences on a transmission characteristic of the whole transmission line when the length ratio of specific optical fibers is changed in each of single, two-part, and three-part transmission lines (with a total length of 250 km and a net gain of −21 dB)
Figure 9B:
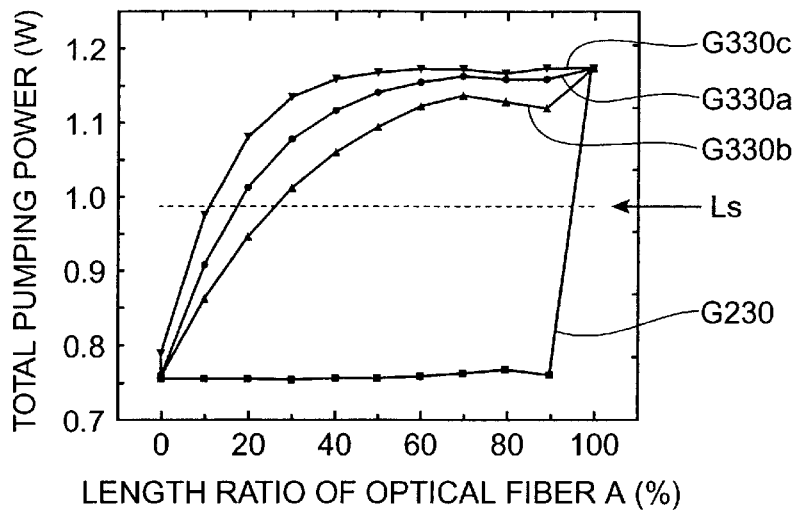

Concerning the single transmission line (FIG. 7B: any of SSMF, optical fiber A, and optical fiber B), two-part transmission line (FIG. 7C: optical fiber A—optical fiber B), and three-part transmission line (FIG. 7D: optical fiber A—optical fiber B—optical fiber A), each having a total length of 250 km and a net gain of −21 dB, FIGS. 9A and 9B show relationships between the ratio (%) of length of optical fiber A in the whole transmission line 300 and the SN ratio (FIG. 9A) and relationships between the length ratio (%) of optical fiber A and the total pumping light power (W) (FIG. 9B).

In particular, in FIG. 9A, curves G220, G320a, G320b, and G320c show respective relationships between the length ratio (%) of optical fiber A and optical SN ratio (dB) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 9A, line Ls indicates the relationship between the length ratio (%) of optical fiber A and optical SN ratio (dB) in SSMF.

In FIG. 9B, on the other hand, curves G230, G330a, G330b, and G330c show respective relationships between the length ratio (%) of optical fiber A and total pumping light power (W) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 9B, line Ls indicates the relationship between the length ratio (%) of optical fiber A and total pumping light power (W) in SSMF.

Figure 10A:
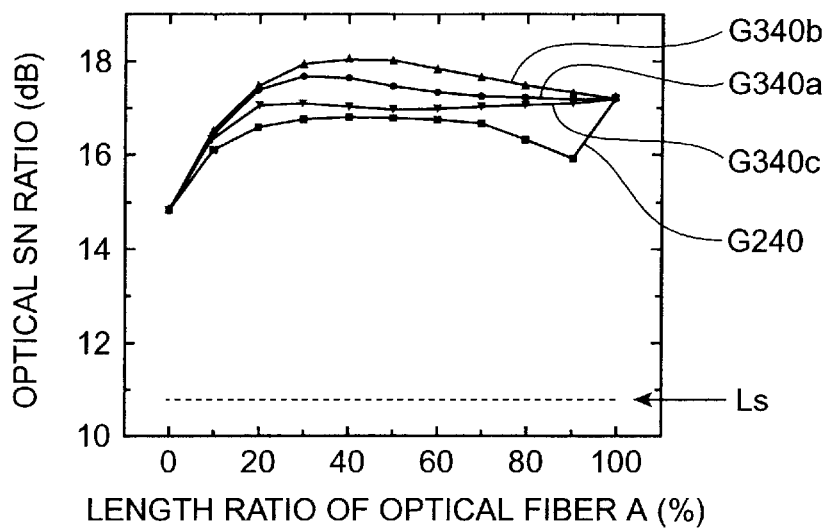
FIGS. 10A and 10B are graphs showing influences on a transmission characteristic of the whole transmission line when the length ratio of specific optical fibers is changed in each of single, two-part, and three-part transmission lines (with a total length of 300 km and a net gain of −16 dB)
Figure 10B:
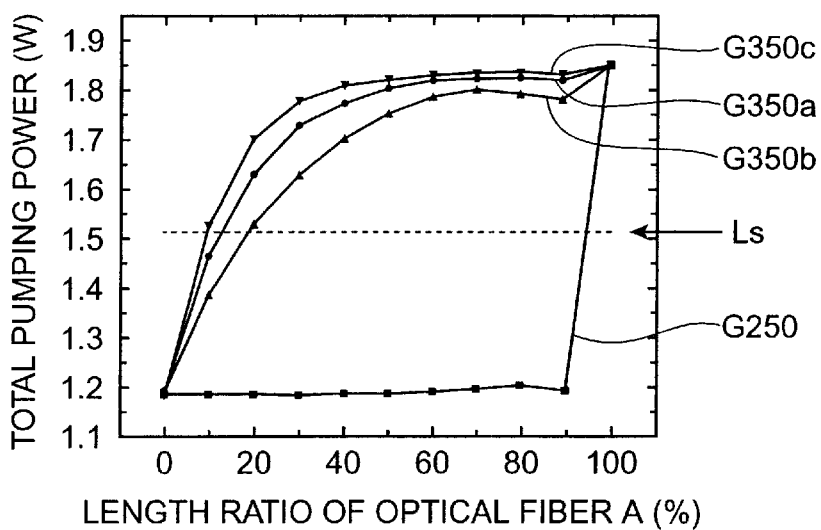

Concerning the single transmission line (FIG. 7B: any of SSMF, optical fiber A, and optical fiber B), two-part transmission line (FIG. 7C: optical fiber A—optical fiber B), and three-part transmission line (FIG. 7D: optical fiber A—optical fiber B—optical fiber A), each having a total length of 300 km and a net gain of −16 dB, FIGS. 10A and 10B show relationships between the ratio (%) of length of optical fiber A in the whole transmission line 300 and the SN ratio (FIG. 10A) and relationships between the length ratio (%) of optical fiber A and the total pumping light power (W) (FIG. 10B).

In particular, in FIG. 10A, curves G240, G340a, G340b, and G340c show respective relationships between the length ratio (%) of optical fiber A and optical SN ratio (dB) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 10A, line Ls indicates the relationship between the length ratio (%) of optical fiber A and optical SN ratio (dB) in SSMF.

In FIG. 10B, on the other hand, curves G250, G350a, G350b, and G350c show respective relationships between the length ratio (%) of optical fiber A and total pumping light power (W) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 10B, line Ls indicates the relationship between the length ratio (%) of optical fiber A and total pumping light power (W) in SSMF.

Figure 11A:
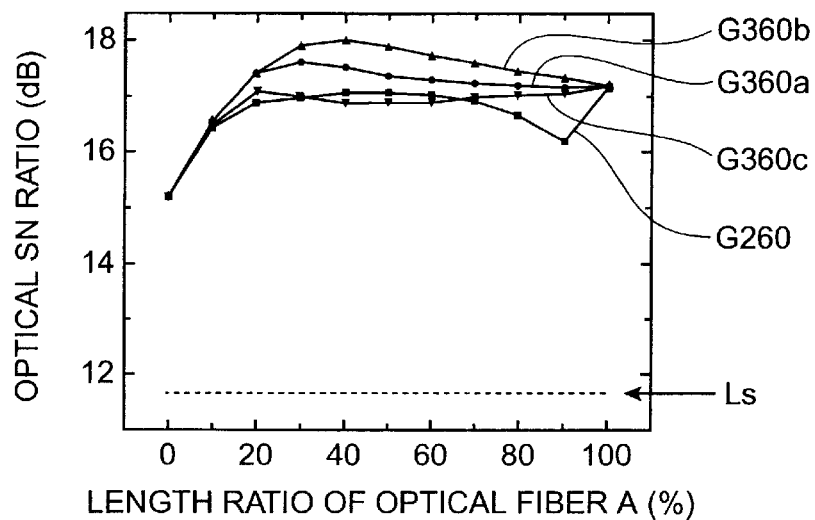
FIGS. 11A and 11B are graphs showing influences on a transmission characteristic of the whole transmission line when the length ratio of specific optical fibers is changed in each of single, two-part, and three-part transmission lines (with a total length of 300 km and a net gain of −21 dB)
Figure 11B:
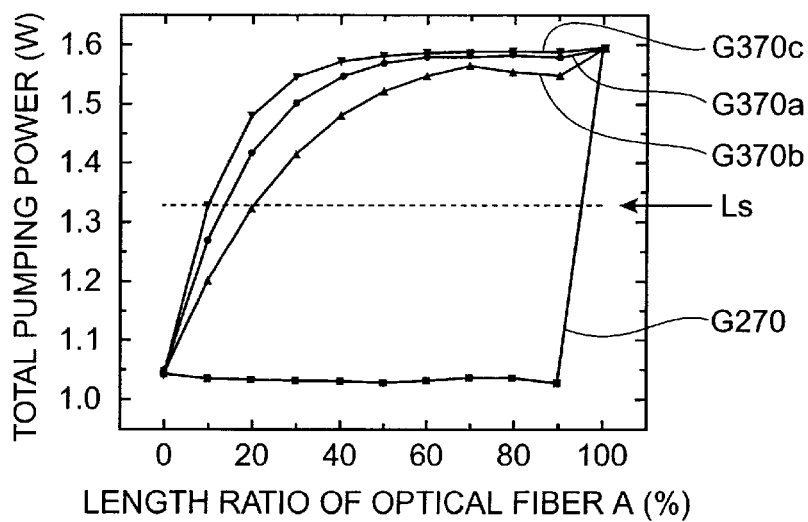

Concerning the single transmission line (FIG. 7B: any of SSMF, optical fiber A, and optical fiber B), two-part transmission line (FIG. 7C: optical fiber A—optical fiber B), and three-part transmission line (FIG. 7D: optical fiber A—optical fiber B—optical fiber A), each having a total length of 300 km and a net gain of −21 dB, FIGS. 11A and 11B show relationships between the ratio (%) of length of optical fiber A in the whole transmission line 300 and the SN ratio (FIG. 11A) and relationships between the length ratio (%) of optical fiber A and the total pumping light power (W) (FIG. 11B).

In particular, in FIG. 11A, curves G260, G360a, G360b, and G360c show respective relationships between the length ratio (%) of optical fiber A and optical SN ratio (dB) in a two-part transmission line, a three-part transmission line in which the length ratio between the optical fiber A on the signal light entrance side and the optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 11A, line Ls indicates the relationship between the length ratio (%) of optical fiber A and optical SN ratio (dB) in SSMF.

In FIG. 1B, on the other hand, curves G270, G370a, G370b, and G370c show respective relationships between the length ratio (%) of optical fiber A and total pumping light power (W) in a two-part transmission line, a three-part transmission line in which the length ratio between the optical fiber A on the signal light entrance side and the is optical fiber A on the pumping light entrance side is set to 1:1, a three-part transmission line in which the length ratio between the optical fiber A on the signal light entrance side and the optical fiber A on the pumping light entrance side is set to 2:1, and a three-part transmission line in which the length ratio between the optical fiber A on the signal light entrance side and the optical fiber A on the pumping light entrance side is set to 1:2. In FIG. 11B, line Ls indicates the relationship between the length ratio (%) of optical fiber A and total pumping light power (W) in SSMF.

As the graphs of FIGS. 8A, 9A, 10A, and 11A show, similar tendencies can be seen in each of the configurations of prepared transmission lines regardless of simulation conditions.

In the two-part transmission line, in particular, the optical SN ratio becomes optimal as a transmission characteristic when the length ratio of optical fiber A is within the range of 30% to 80%. In other words, letting L1 be the length of the optical fiber A on the signal light entrance side and L2 be the length of the optical fiber B on the pumping light entrance side in a two-part transmission line, the length ratio (L2/(L1+L2)) of the optical fiber B with respect to the total length of transmission line (L1+L2) is preferably 0.2 or more but 0.7 or less. Also, the graphs of FIGS. 8B, 9B, 10B, and 11B indicate that two-part transmission lines having a configuration in which optical fibers A and B are disposed on the signal light entrance side and pumping light entrance side, respectively, can suppress the pumping light power to a lower level even when compared with single transmission lines and the like.

When the optical fiber A disposed on the signal light entrance side and the optical fiber A disposed on the pumping light entrance side have a length ratio of 1:1 therebetween in a three-part transmission line, the length ratio of optical fibers A in the optimal range within which the optical SN ratio is expected to improve is 20% to 50%, in which the length ratio of the optical fiber A positioned on the pumping light entrance side with respect to the total length is 10% to 25%. When the optical fiber A disposed on the signal light entrance side and the optical fiber A disposed on the pumping light entrance side have a length ratio of 2:1 therebetween, the length ratio of optical fibers A in the optimal range within which the optical SN ratio is expected to improve is 30% to 70%, in which the length ratio of the optical fiber A positioned on the pumping light entrance side with respect to the total length is 10% to 23.3%. When the optical fiber A disposed on the signal light entrance side and the optical fiber A disposed on the pumping light entrance side have a length ratio of 1:2 therebetween, the length ratio of optical fibers A in the optimal range within which the optical SN ratio is expected to improve is 20% to 30%, in which the length ratio of the optical fiber A positioned on the pumping light entrance side with respect to the total length is 13.3% to 20%. Therefore, letting L1 be the length of the optical fiber A on the signal light entrance side, L2 be the length of the optical fiber B, and L3 be the length of the optical fiber A on the pumping light entrance side in a three-part transmission line, the length ratio (L3/(L1+L2+L3)) of the optical fiber A with respect to the total length of transmission line (L1+L2+L3) is preferably 0.1 or more but 0.25 or less.

When the length ratio between the optical fiber A on the signal entrance side and the optical fiber A on the pumping light entrance side is not optimized, the optical SN ratio of the above-mentioned three-part transmission line may become inferior to that of two-part transmission lines. On the other hand, the transmission line in which the length ratio between the optical fiber A on the signal entrance side and the optical fiber A on the pumping light entrance side is set to 1:1 or 2:1 yields transmission characteristics superior to those of two-part transmission lines.

Figure 12A:
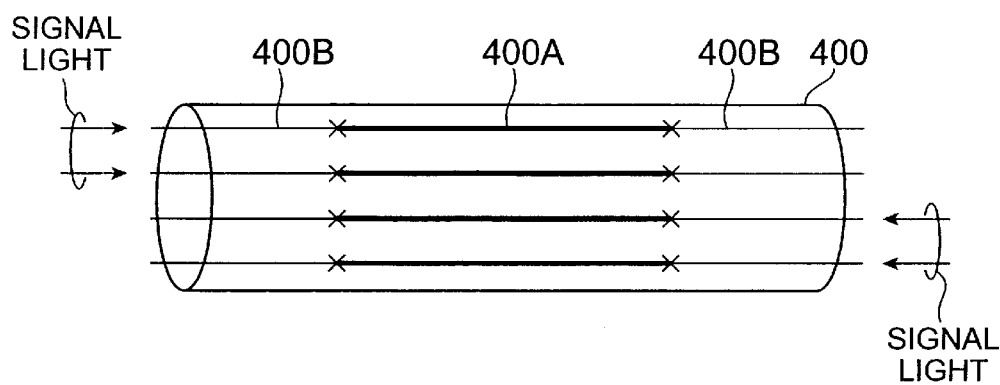
FIGS. 12A and 12B are views for explaining the optical cable according to the present invention.
Figure 12B:
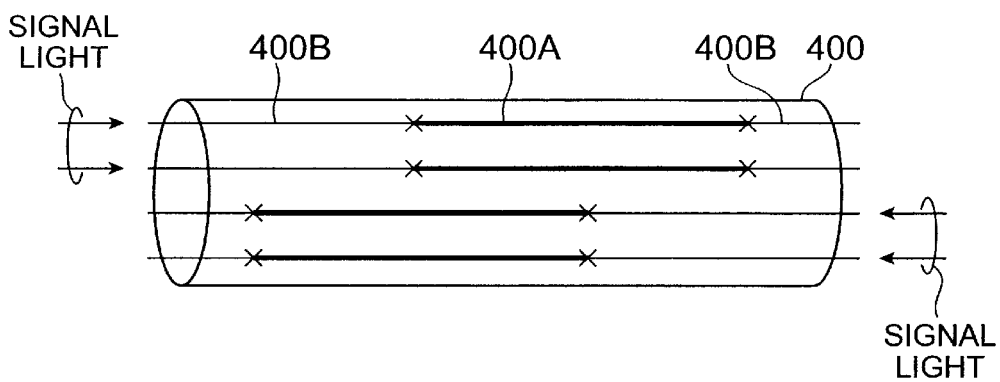

FIGS. 12A and 12B are views showing configurations of optical cables 400 according to the present invention, illustrating cable configurations employing the above-mentioned three-part transmission lines. Each three-part transmission line has a configuration in which an optical fiber 400A having a higher nonlinearity corresponding to the above-mentioned optical fiber B is held between optical fibers 400B each having a lower nonlinearity corresponding to the above-mentioned optical fiber A.

In the optical cable shown in FIG. 12A, the length ratio between the optical fibers 400B positioned on both sides of the optical fiber 400A is set to 1:1, whereas the optical fibers 400B are divided 1:1 on the input and output sides of signal light. For reducing the influence of power of inputted signal light in the optical cable shown in FIG. 12B, the length ratio between the optical fibers 400B positioned on both sides of the optical fiber 400A is set to 1:1, whereas the optical fibers 400B are divided 2:1 on the input and output sides. The optical fibers on the signal light entrance side are identified by coloring beforehand in the optical cable of FIG. 12B. In the optical cables 400 shown in FIGS. 12A and 12B, the optical fibers 400B positioned on both ends of the optical fiber 400A have the same length in each of the three-part transmission lines, whereby it is advantageous in that the fiber configuration is hard to be complicated even when making a bidirectional non-repeating optical cable. When a transmission line is constituted by different kinds of optical fibers as such, the transmission loss of each optical fiber is preferably 0.18 dB/km or less at a wavelength of 1550 nm, whereas the splice loss in each fused part is preferably 0.2 dB or less. This is because of the fact that, since there are at least five fused parts including the entrance and exit ends in each of the optical cables 400 shown in FIGS. 12A and 12B, the total splice loss exceeds 1 dB unless the splice loss of each fused part is 0.2 dB or less, thereby deteriorating transmission characteristics. There are cases where conventional optical cables have a structure in which an EDF (Erbium-Doped Fiber) for optical amplification is inserted in a transmission line. By contrast, the optical cable according to the present invention is realized by a simple structure, thus being able to reduce the number of its components greatly.

Figure 13A:
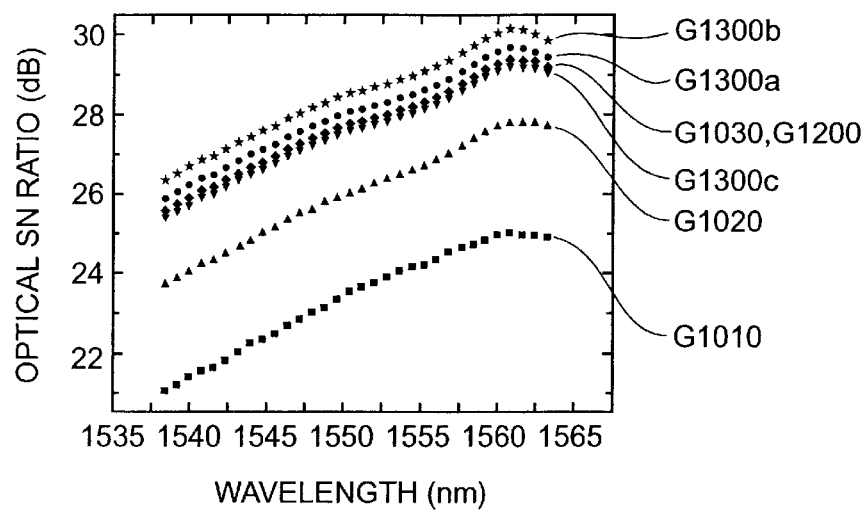
FIGS. 13A and 13B are graphs showing respective wavelength dependence characteristics of optical SN ratio and Rayleigh crosstalk concerning various optical fiber transmission lines having a total length of 250 km and a gain of −16 dB.
Figure 13B:
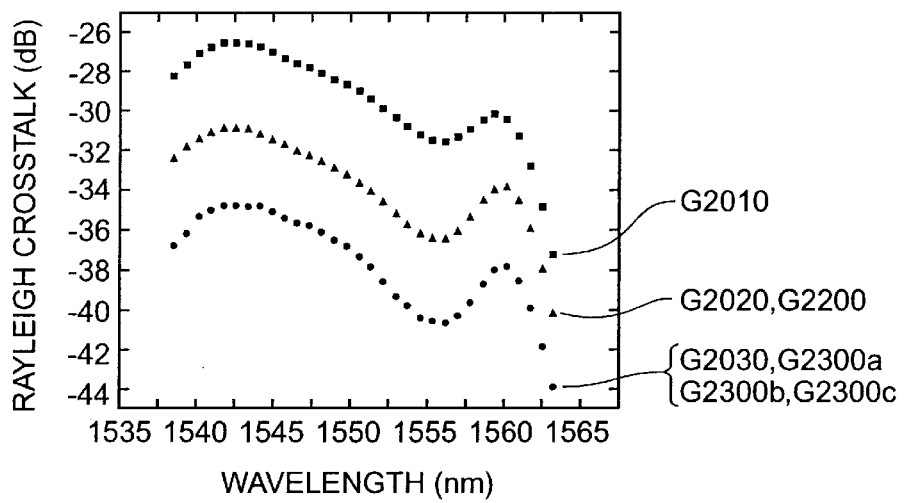

FIGS. 13A and 13B are graphs showing respective wavelength dependence characteristics of optical SN ratio and Rayleigh crosstalk (crosstalk between signal light and double Rayleigh scattering light) concerning various optical fiber transmission lines each having a total length of 250 km and a gain of −16 dB. In FIG. 13A, curves G1010, G1020, G1030, G1200, G1300a, G1300b, and G1300c show respective wavelength dependence characteristics of optical SN ratio concerning an SSMF, an SMF having a core region made of pure silica glass, an SMF having a core region made of pure silica glass and an effective area greater than that of the SMF of curve G1020, a two-part transmission line, a three-part transmission line in which the optical fiber on the signal entrance side and the optical fiber on the pumping light entrance side have a length ratio of 1:1 therebetween, a three-part transmission line in which the optical fiber on the signal entrance side and the optical fiber on the pumping light entrance side have a length ratio of 2:1 therebetween, and a three-part transmission line in which the optical fiber on the signal entrance side and the optical fiber on the pumping light entrance side have a length ratio of 1:2 therebetween. In FIG. 13A, curves G1030, G1200, and G1300c are plotted in a substantially overlying state.

In FIG. 13B, on the other hand, curves G2010, G2020, G2030, G2200, G2300a, G2300b, and G2300c show respective wavelength dependence characteristics of Rayleigh crosstalk concerning an SSMF, an SMF having a core region made of pure silica glass, an SMF having a core region made of pure silica glass and an effective area greater than that of the SMF of curve G2020, a two-part transmission line, a three-part transmission line in which the optical fiber on the signal entrance side and the optical fiber on the pumping light entrance side have a length ratio of 1:1 therebetween, a three-part transmission line in which the optical fiber on the signal entrance side and the optical fiber on the pumping light entrance side have a length ratio of 2:1 therebetween, and a three-part transmission line in which the optical fiber on the signal entrance side and the optical fiber on the pumping light entrance side have a length ratio of 1:2 therebetween. In FIG. 13B, curves G2030 and G2300a to G2300c are plotted in a substantially overlying state.

As these graphs show, it can be seen that Rayleigh crosstalk is more effectively suppressed in each of the twoand three-part transmission lines than in the SMF transmission lines, and that the three-part transmission lines effectively reduce Rayleigh crosstalk in particular.

Figure 14:
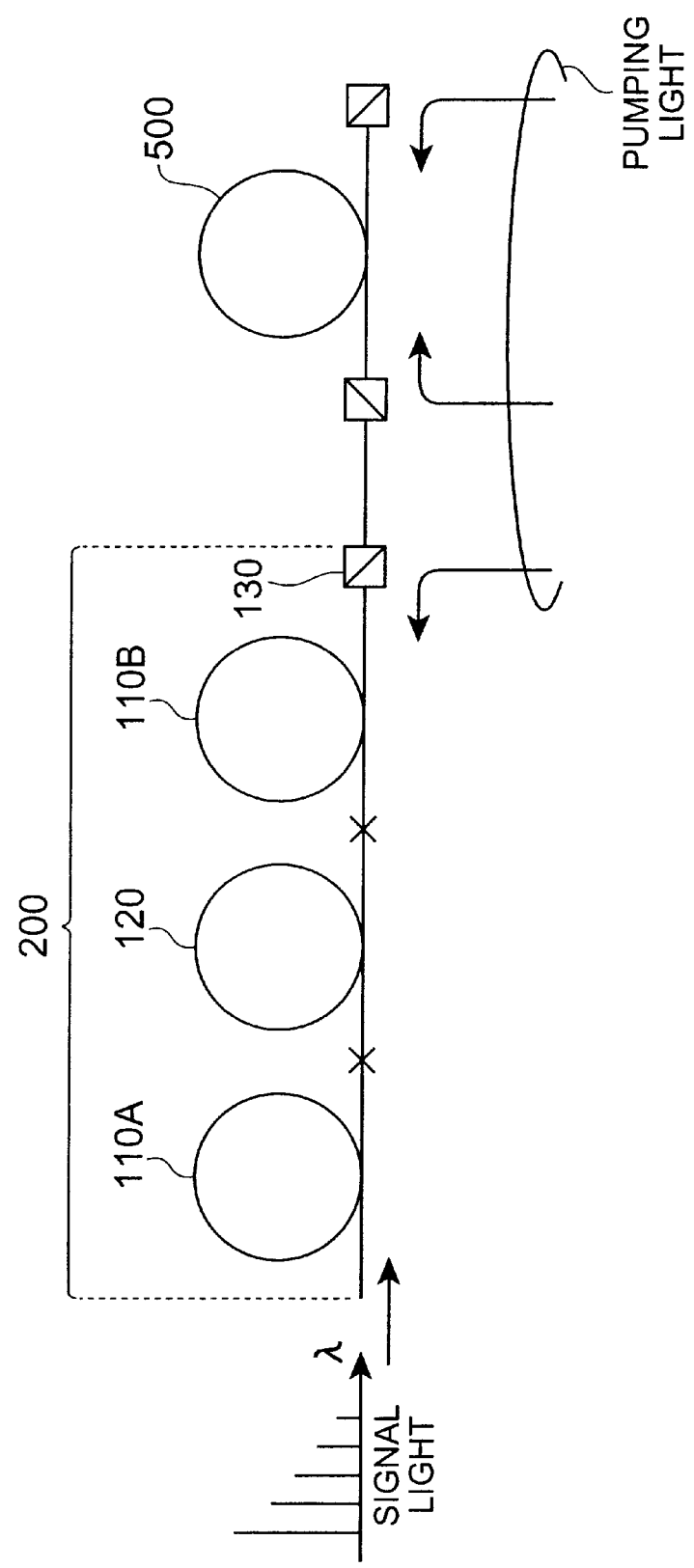
FIG. 14 is a view showing the configuration of a fourth embodiment in the optical fiber transmission line according to the present invention.

For ameliorating nonlinear phenomena between signal channels, the transition of optical power on the shorter wavelength side to the longer wavelength side due to Raman amplification in particular, a Raman amplification optical fiber 500 (for bidirectional pumping) having a negative chromatic dispersion may be provided downstream the three-part transmission line 200 as shown in FIG. 14 in the optical fiber transmission line according to the present invention. Such a configuration makes it possible to collectively amplify light in a wider band.

Figure 15:
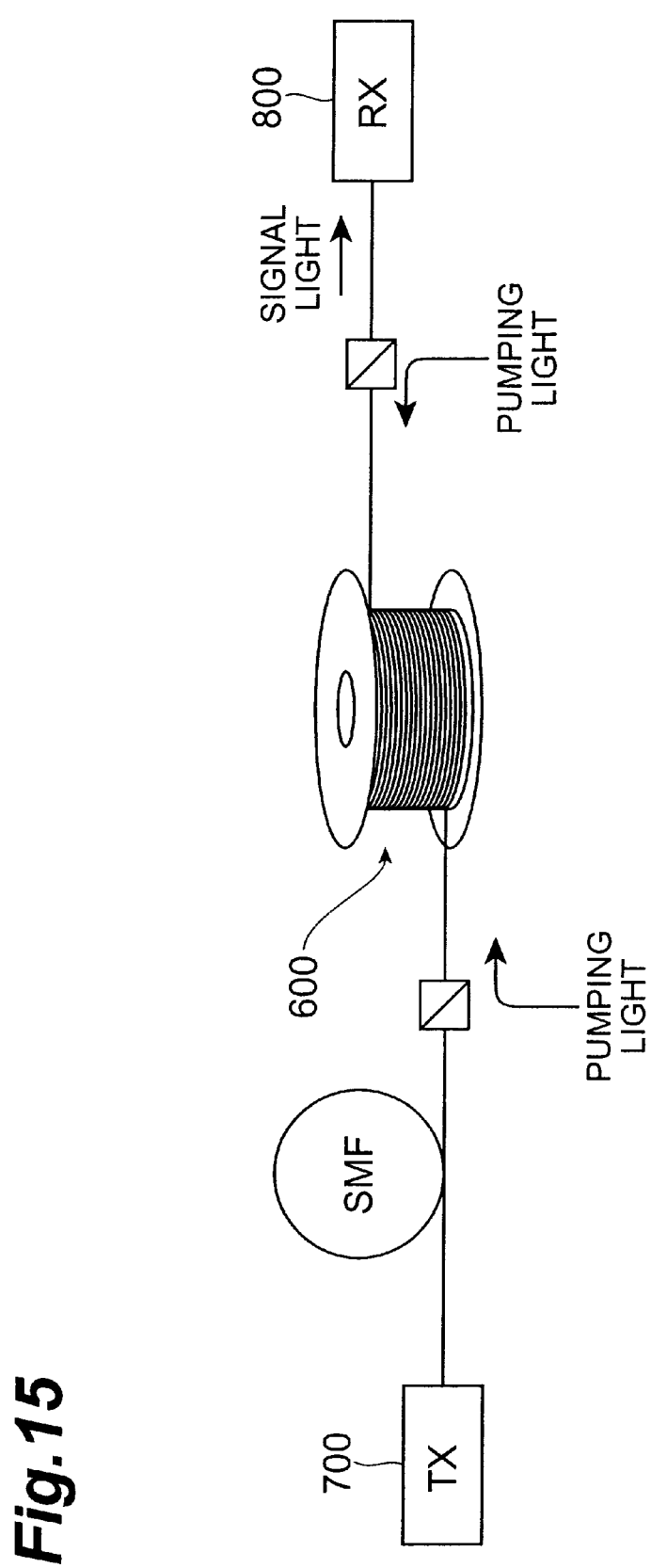
FIG. 15 is a view showing the configuration of a second embodiment in the optical transmission system according to the present invention.

FIG. 15 is a view showing the configuration of an optical transmission system according to the present invention. This optical transmission system comprises a transmitter (TX) 700 for emitting a plurality of channels of signals and a receiver (RX) 800 for receiving the signals, whereas an optical fiber transmission line 600 having a structure such as one mentioned above is disposed therebetween. This configuration can remarkably reduce the number of components as compared with the conventional EDFA (Erbium-Doped Fiber Amplifier), while a configuration such as the one shown in FIG. 14 makes it possible to collectively amplify light in a wider band.

As in the foregoing, the present invention supplies Raman amplification pumping light to the optical fiber having the higher nonlinearity in a two-part transmission line while regulating the length ratio of optical fibers such that, for example, the length ratio of the optical fiber on the side supplied with the Raman amplification pumping light becomes about 0.2 to 0.7, thereby being effective in that desirable transmission characteristics can be obtained at a lower pumping light power.

In a three-part transmission line, on the other hand, optical fibers each having a lower nonlinearity are disposed upstream and downstream an optical fiber having a higher nonlinearity, whereas Raman amplification pumping light is supplied to at least one of the optical fibers having a lower nonlinearity, whereby it is effective in that stable transmission characteristics are obtained without deteriorating signals even when the power of supplied pumping light becomes greater.

What is claimed is:

1. An optical transmission line, comprising:
   a first optical fiber comprising an entrance end for receiving signal light and an exit end for emitting said signal light, said first optical fiber having, as characteristics at a wavelength of 1550 nm, a first effective area $A_{eff1}$ and a first chromatic dispersion D1, and having a first length L1;
   a second optical fiber comprising an entrance end fusion-spliced to the exit end of said first optical fiber, and an exit end for emitting said signal light, said second optical fiber having, as characteristics at the wavelength of 1550 nm, a second effective area $A_{eff2}$ smaller than said first effective area $A_{eff1}$ and a second chromatic dispersion D2 different from said first chromatic dispersion D1, and having a second length L2 different from said first length L1; and
   an optical multiplexer optically coupled to the entrance end of said first optical fiber so as to supply Raman amplification pumping light to said first optical fiber together with said signal light, or optically coupled to the exit end of said second optical fiber so as to supply Raman amplification pumping light to said second optical fiber while transmitting therethrough the signal light emitted from said second optical fiber;
   wherein at least one of said first and second optical fibers has a core region substantially made of pure silica glass.

2. An optical fiber transmission line according to claim 1, wherein said second optical fiber has a length ratio (L2/(L1+L2)) of 0.2 or more but 0.7 or less with respect to the total length (L1+L2) of said optical fiber transmission line.

3. An optical fiber transmission line according to claim 1, wherein each of said first chromatic dispersion D1 and said second chromatic dispersion D2 is positive.

4. An optical fiber transmission line according to claim 1, wherein said second effective area $A_{eff2}$ is greater than 50 $\mu m^2$.

5. An optical fiber transmission line according to claim 1, wherein said first effective area $A_{eff1}$ is greater than 90 $\mu m^2$.

6. An optical fiber transmission line according to claim 1, wherein the core region in each of said first and second optical fibers has a relative refractive index difference with a maximum value of −0.1% or more but +0.1% or less with reference to pure silica glass.

7. An optical fiber transmission line according to claim 1, wherein the optical fiber having a core region substantially made of pure silica glass in said first and second optical fibers has a loss of 0.18 dB/km or less at the wavelength of 1550 nm.

8. An optical fiber transmission line according to claim 1, wherein said first and second optical fibers have a fusion-splicing loss of 0.2 dB or less therebetween.

9. An optical fiber transmission line according to claim 1, further comprising a structure for ameliorating a nonlinear optical phenomenon between channels included in signal light reaching the entrance end of said first optical fiber.

10. An optical fiber transmission line according to claim 1, further comprising:
    a third optical fiber having a negative chromatic dispersion as a characteristic at the wavelength of 1550 nm; and
    an optical multiplexer for supplying Raman amplification pumping light to said third optical fiber from at least one of entrance and exit ends thereof.

11. An optical fiber transmission line according to claim 10, wherein said third optical fiber has a core region substantially made of pure silica glass.

12. An optical fiber transmission line according to claim 11, wherein said third optical fiber has a loss of 0.18 dB/km or less at the wavelength of 1550 nm.

13. An optical cable including the optical fiber transmission line according to claim 1.

14. An optical transmission system, comprising:
    a transmitter for transmitting a plurality of channels of signal light;
    the optical fiber transmission line according to claim 1; and
    a receiver for receiving a signal propagated through said optical fiber transmission line.

15. An optical transmission line, comprising:
    a first optical fiber comprising an entrance end for receiving signal light and an exit end for emitting said signal light, said first optical fiber having, as characteristics at a wavelength of 1550 nm, a first effective area $A_{eff1}$ and a first chromatic dispersion D1, and having a first length L1;
    a second optical fiber comprising an entrance end fusion-spliced to the exit end of said first optical fiber, and an exit end for emitting said signal light, said second optical fiber having, as characteristics at the wavelength of 1550 nm, a second effective area $A_{\mathit{eff2}}$ smaller than said first effective area $A_{\mathit{eff1}}$ and a second chromatic dispersion D2 different from said first chromatic dispersion D1, and having a second length L2 different from said first length L1;

a third optical fiber comprising an entrance end fusion-spliced to the exit end of said second optical fiber, and an exit end for emitting said signal light, said third optical fiber having, as characteristics at the wavelength of 1550 nm, a third effective area $A_{\mathit{eff3}}$ greater than said second effective area $A_{\mathit{eff2}}$ and a third chromatic dispersion D3 different from said second chromatic dispersion D2, and having a third length L3 different from said second length L2; and an optical multiplexer optically coupled to the entrance end of said first optical fiber so as to supply Raman amplification pumping light to said first optical fiber together with said signal light, or optically coupled to the exit end of said third optical fiber so as to supply Raman amplification pumping light to said third optical fiber while transmitting therethrough the signal light emitted from said third optical fiber;

wherein at least one of said first to third optical fibers has a core region substantially made of pure silica glass.

16. An optical fiber transmission line according to claim 15, wherein said third optical fiber has a length ratio (L3/(L1+L2+L3)) of 0.1 or more but 0.25 or less with respect to the total length (L1+L2+L3) of said optical fiber transmission line.

17. An optical fiber transmission line according to claim 15, wherein the length L1 of said first optical fiber is equal to or greater than the length L3 of said third optical fiber.

18. An optical fiber transmission line according to claim 15, wherein each of said first to third chromatic dispersions D1 to D3 is positive.

19. An optical fiber transmission line according to claim 15, wherein said second effective area $A_{\mathit{eff2}}$ is greater than 50 $\mu m^2$.

20. An optical fiber transmission line according to claim 15, wherein at least one of said first effective area $A_{\mathit{eff1}}$ and said third effective area $A_{\mathit{eff3}}$ is greater than 90 $\mu m^2$.

21. An optical fiber transmission line according to claim 15, wherein the core region in each of said first to third optical fibers has a relative refractive index difference with a maximum value of −0.1% or more but +0.1% or less with reference to pure silica glass.

22. An optical fiber transmission line according to claim 15, wherein the optical fiber having a core region substantially made of pure silica glass in said first to third optical fibers has a loss of 0.18 dB/km or less at the wavelength of 1550 nm.

23. An optical fiber transmission line according to claim 15, wherein each of the fusion-splicing loss between said first and second optical fibers, and the fusion-splicing loss between said second and third optical fibers is 0.2 dB or less.

24. An optical fiber transmission line according to claim 15, further comprising a structure for ameliorating a non-linear optical phenomenon between channels included in signal light reaching the entrance end of said first optical fiber.

25. An optical fiber transmission line according to claim 15, further comprising:

a fourth optical fiber having a negative chromatic dispersion as a characteristic at the wavelength of 1550 nm; and an optical multiplexer for supplying Raman amplification pumping light to said fourth optical fiber from at least one of entrance and exit ends thereof.

26. An optical fiber transmission line according to claim 25, wherein said fourth optical fiber has a core region substantially made of pure silica glass.

27. An optical fiber transmission line according to claim 26, wherein said fourth optical fiber has a loss of 0.18 dB/km or less at the wavelength of 1550 nm.

28. An optical cable including the optical fiber transmission line according to claim 15.

29. An optical transmission system comprising:

a transmitter for transmitting a plurality of channels of signal light;

the optical fiber transmission line according to claim 15; and a receiver for receiving a signal propagated through said optical fiber transmission line.

30. An optical fiber transmission line including a first optical fiber, a second optical fiber disposed at a position where signal light outputted from said first optical fiber reaches, and an optical multiplexer for supplying said second optical fiber with Raman amplification pumping light having a wavelength which can Raman-amplify the signal light propagating through said second optical fiber;

wherein said first optical fiber has an effective area greater than that of said second optical fiber and a Raman gain smaller than that of said second optical fiber; and wherein each of said first and second optical fibers has a core region substantially made of pure silica glass.

31. An optical fiber transmission line according to claim 30, wherein the core region in each of said first and second optical fibers has a relative refractive index difference with a maximum value of −0.1% or more but +0.1% or less with reference to pure silica glass.

32. An optical fiber transmission line according to claim 30, further comprising a third optical fiber disposed at a position where the signal light outputted from said second optical fiber reaches, and an optical multiplexer for supplying said Raman amplification pumping light to said third optical fiber.

33. An optical fiber transmission line according to claim 32, wherein the sum of respective lengths of said first and second optical fibers is longer than the length of said third optical fiber.

34. An optical transmission system including the optical fiber transmission line according to claim 30.

* * * * *